United States Patent
Kobayashi

(10) Patent No.: US 7,212,510 B2
(45) Date of Patent: May 1, 2007

(54) WIRELESS LAN SYSTEM AND A TRANSMITTER-RECEIVER IN A WIRELESS LAN SYSTEM

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1029 days.

(21) Appl. No.: 10/052,268

(22) Filed: Jan. 23, 2002

(65) Prior Publication Data

US 2002/0067711 A1 Jun. 6, 2002

Related U.S. Application Data

(62) Division of application No. 09/040,426, filed on Mar. 18, 1998.

(30) Foreign Application Priority Data

Aug. 12, 1997 (JP) .................................. 9-217472

(51) Int. Cl.
*H04Q 7/24* (2006.01)
*H04J 3/16* (2006.01)

(52) U.S. Cl. ...................................... 370/338; 370/465
(58) Field of Classification Search ................ 370/338, 370/252
See application file for complete search history.

(56) References Cited

U.S. PATENT DOCUMENTS

| 5,117,236 A | | 5/1992 | Chang et al. | |
| 5,966,186 A | * | 10/1999 | Shigihara et al. | ......... 455/67.11 |
| 6,016,313 A | * | 1/2000 | Foster et al. | ................. 370/338 |

FOREIGN PATENT DOCUMENTS

| EP | 0 432 647 | 6/1991 |
| EP | 0 432 647 A3 | 6/1991 |
| EP | 0 599 632 | 6/1994 |
| EP | 0 599 632 A2 | 6/1994 |
| EP | 0 713 262 | 5/1996 |

(Continued)

OTHER PUBLICATIONS

Naohisa Goto, "New Antenna Technology", Shin-Ohm Bunko, Nov. 20, 1998, pp. 34-37.

(Continued)

Primary Examiner—Andrew C. Lee
(74) Attorney, Agent, or Firm—Staas & Halsey LLP

(57) ABSTRACT

In a wireless LAN system chiefly using a millimeter wave, a satellite station is provided with an active phased planar-array antenna, the radiating directivity characteristic of which can be freely changed. When a master station receives a control frame transmitted from the satellite station prior to the commencement of normal communication, the master station transmits a carrier wave. The satellite station determines such a directivity characteristic of an antenna as to receive this carrier wave with the strongest intensity, and fixes the characteristic. Thus, an optimal communication environment can be secured. When the number of errors in a received data frame or the receiving electric field intensity received by the satellite station in normal communication is inferior to a respective predetermined threshold, the deterioration of the communication environment can be coped with by determining again. The power consumption of the master station can be reduced by making the transmitting power of a carrier wave for determining less than the transmitting power at the time of normal communication.

7 Claims, 23 Drawing Sheets

FOREIGN PATENT DOCUMENTS

| | | |
|---|---|---|
| EP | 0 713 262 A2 | 5/1996 |
| JP | 5-74037 | 10/1993 |
| JP | 6-188617 | 7/1994 |
| JP | 6-334423 | 12/1994 |
| JP | 7-283641 | 10/1995 |
| JP | 8-116208 | 5/1996 |
| JP | 8-213824 | 8/1996 |
| JP | 9-64876 | 3/1997 |
| WO | WO 95/20249 | 10/1995 |
| WO | WO 97/22289 | 9/1997 |
| WO | WO 97/33389 | 9/1997 |

OTHER PUBLICATIONS

Notice of Rejection for corresponding Japanese Appln. No. 9-217472 dated Apr. 14, 2005.

Communication (Decision on Rejection) for corresponding Japanese Application No. 9-217472 mailed Dec. 20, 2005.

Office Action for corresponding European Application No. 98 302140.3 dated Mar. 31, 2005.

Naohisa Goto, "New Antenna Technology", Shin-Ohm Bunko, Nov. 20, 1998, pp. 34-37.

* cited by examiner

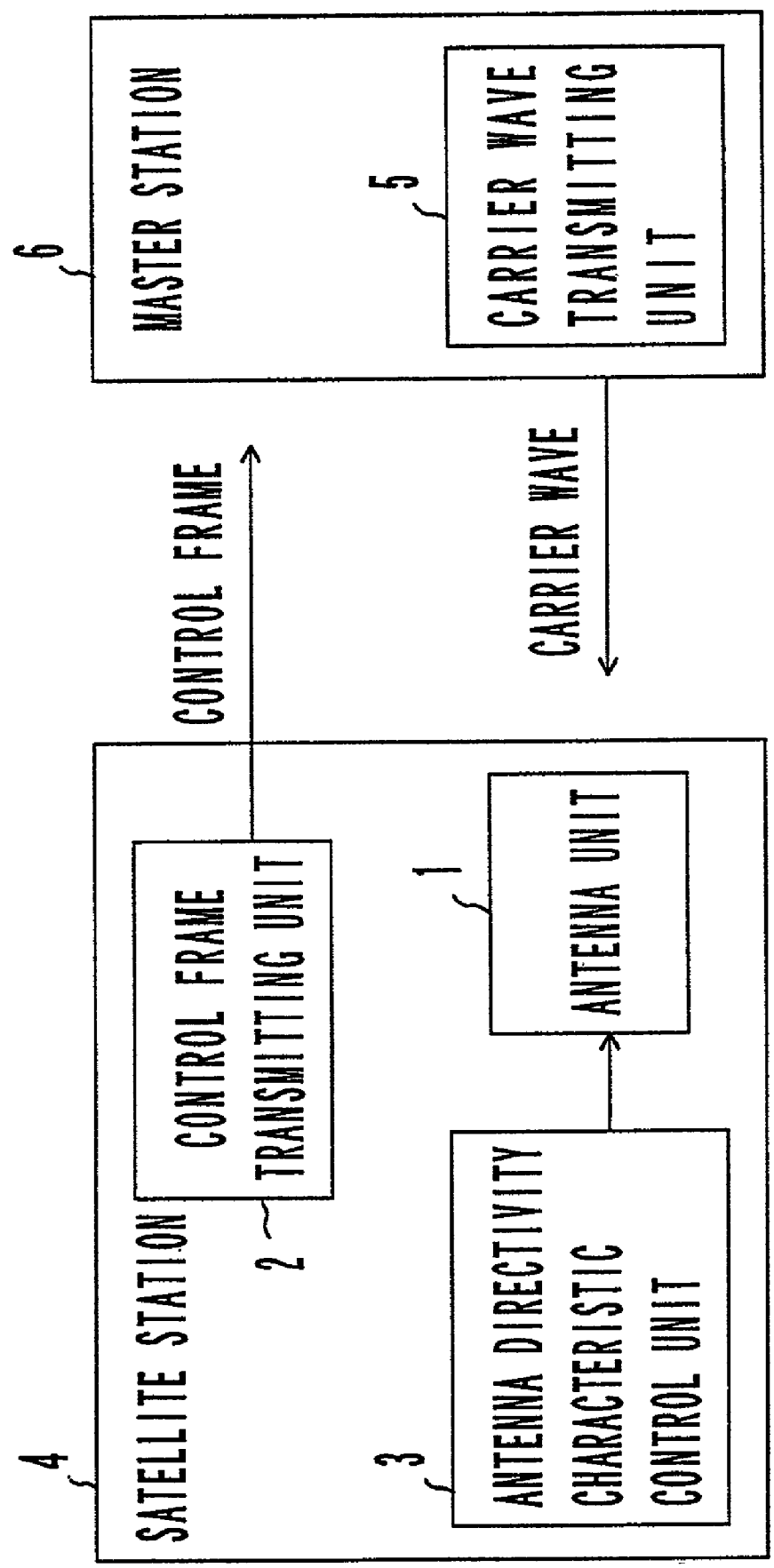
F I G. 1

WIRELESS LAN SYSTEM AND A TRANSMITTER-RECEIVER IN A WIRELESS LAN SYSTEM

CROSS-REFERENCE TO RELATED APPLICATIONS

This application is a Divisional of application Ser. No. 09/040,426, filed Mar. 18, 1998, now pending.

BACKGROUND OF THE INVENTION

1. Field of the Invention

The present invention relates to a local area network (LAN), more specifically to the optimization of communication quality for realizing an optimal communication environment between a wireless LAN satellite station and a master station in a wireless LAN system mainly using an electromagnetic wave in a millimeter wave range.

2. Description of the Related Art

These days a LAN has become popular and the amount of data handled on a LAN has been also increasing. On the other hand, data terminals including a personal computer have been improved in communicating functions, and have been miniaturized. Under these circumstances, the need for data communication in a mobile environment is advocated, and attention is being paid to a wireless LAN system.

So far an electromagnetic wave in an ISM range, that is, approximately the 1 to 3 GHz range, has been used for a wireless LAN system. However, since this bandwidth is also used for industrial purposes or electronic ovens, a large amount of noise is generated. To suppress this large amount of noise it is necessary to employ a spread spectrum communication method, which has made a system complicated. The system also has a drawback that in this wave range a bandwidth required for a high speed transmission cannot be secured.

For this reason, attention is currently being paid to a millimeter wave range of 50 to 70 GHz which is still an unused wave range for data communication.

An electromagnetic wave in this wave range is characterized in that it is strong to keep straight on, and it is easily absorbed by oxygen and glass. For example, since there is little possibility that an electromagnetic wave leaks outside when it is used in an office environment, it is effective in security. Furthermore, since it is an unused band width, and thereby there is no need to employ a spread spectrum communication method, the system can be simplified, compared with the case when an ISM range is used. Since in a millimeter wave range a band with required for a high speed transmission can be secured, it is a very promising wave range at present when a high speed transmission of over 100 Mbps is becoming popular in a wired LAN system.

However, the wireless LAN system using an electromagnetic wave in a millimeter range has the following problems.

The first problem is that a communication environment rapidly deteriorates due to a subtle change of the position and direction of an antenna of a satellite station. In order to expand a communication-available area in a millimeter wave wireless LAN system an antenna with a rather broad radiating directivity is usually used for the master station. However, a millimeter wave is strong to keep straight on and is easily absorbed by oxygen. There is also influence from interference among satellite stations and multipath interference which is caused by being a plurality of routes for an electromagnetic wave transmitted from a satellite station. For this reason, to secure a favorable communication environment, it is necessary to sharpen the radiation characteristic of the antennae of satellite stations and to always direct the radiation characteristic of the satellite stations exactly to the antenna of the master station.

To avoid the influence from interference among satellite stations and multipath, the use of diversity antennae and the introduction of a spread spectrum communication method can be considered. However, it is technically difficult to implement these methods in a millimeter wave range, and even if it can be implemented, the system becomes complicated. This is the second problem.

SUMMARY OF THE INVENTION

It is an object of the present invention to provide a millimeter wave wireless LAN system in which a favorable communication environment can be secured between a satellite station and a master station by directing the radiation characteristic of an antenna of a wireless LAN satellite station exactly to an antenna of the master station in view of the above mentioned problems.

To attain the object of the present invention as described above, a wireless LAN system of the present invention comprises a wireless LAN master station for supporting communication between satellite stations belonging to the master station and one or more wireless LAN satellite stations. A transmitter-receiver in the system being a satellite station of the LAN system comprises an antenna, the directivity characteristic of which can be dynamically changed when receiving waves from the master station, control frame transmitting means for transmitting a control frame to the master station prior to the commencement of communication, and antenna directivity characteristic controlling means for determining such a directivity characteristic that the receiving electric field intensity of a carrier wave transmitted from the master station when the control frame is transmitted may become a maximum by changing the directivity characteristic of an antenna. A transmitter-receiver for communicating with another party in the system being the master station comprises carrier wave transmitting means for transmitting a carrier wave when receiving the control frame. In the wireless LAN system of the present invention, prior to the commencement of communication, a satellite station transmits a control frame to the master station. When the master station receives the control frame from the satellite station, it starts to transmit a carrier wave. When the satellite station receives the carrier wave transmitted from the master station, it changes the directivity characteristic of an antenna, and determines such a directivity characteristic that the receiving electric field intensity of the carrier wave may become a maximum.

After that, by using the directivity characteristic obtained from the result of the determination, communication between a satellite station and the master station can be carried out in an optimal communication environment.

For an antenna of a satellite station an active phased planar-array antenna can be used. Thus, without adjusting the physical position of an antenna of a satellite station, communication between a satellite station and the master station can be carried out in an optimal communication environment.

Further, after the satellite station starts to exchange data frames as communications with the master station, conditions can be set for the number of errors detected in a data frame that are allowed to be received, or the electric field intensity of the data frame that is allowed to be received, and when the conditions are not met, an optimal antenna directivity characteristic can be determined again. Thus, the deterioration of communication quality occurring because a satellite station or the master station moves or because the position of an antenna is shifted due to some cause, can be automatically coped with, and an optimal communication environment can be always provided.

Furthermore, the transmitting power of a carrier wave which is transmitted when the master station receives a control frame from a satellite station, can be less than the transmitting power at the time of the transmission of a data frame as normal communication. Thus, the power consumption of the master station can be reduced.

BRIEF DESCRIPTION OF THE DRAWINGS

The present invention will be more apparent from the following detailed description, when taken in conjunction with the accompanying drawings, in which:

FIG. 1 is a block diagram showing the theoretical configuration of the present invention.

DETAILED DESCRIPTION OF THE PREFERRED EMBODIMENTS

Figure 2:
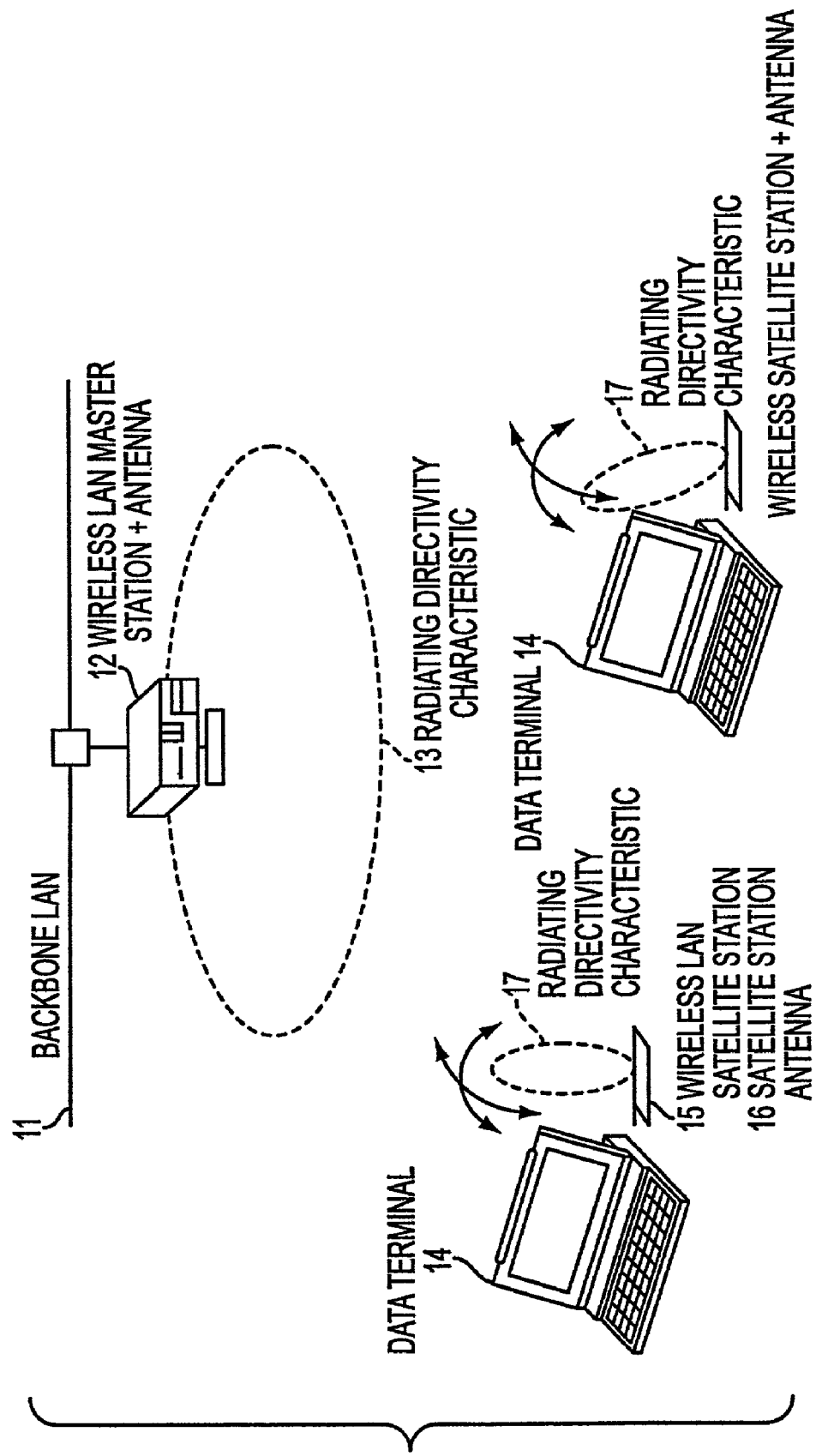
FIG. 2 shows the basic configuration of a wireless LAN system of the present invention.

FIG. 1 is a block diagram of the principle and the configuration of the present invention. This is a block diagram of the theoretical configuration of a wireless LAN system connected to a backbone LAN and comprises a wireless master station supporting communication between satellite stations belonging to the master station and one or more wireless LAN satellite stations. The master station and satellite stations are transmitter-receivers which can communicate with each other.

As shown in FIG. 1, a satellite station 4 comprises an antenna unit 1, a control frame transmitting unit 2 and an antenna directivity characteristic control unit, whereas the master station 6 comprises a carrier wave transmitting unit 5.

When the antenna unit 1 receives electric waves from the master station, the antenna unit 1 can change the directivity characteristic of the antenna unit 1. Prior to the commencement of communication with the master station or another satellite station or when communication conditions deteriorate after the commencement of communication, the control frame transmitting unit 2 transmits a control frame to the master station 6.

The antenna directivity characteristic control unit 3 changes the directivity characteristic of the antenna unit 1, for example, an active phased planar-array antenna, and determines such a directivity characteristic that the receiving electric field density of a carrier wave transmitted from the master station when the master station receives the control frame may become a maximum.

The carrier wave transmitting unit 5 starts to transmit a carrier wave when the master station receives the control frame from a satellite station.

Usually LAN data has a characteristic of being concentrated and communicated at a certain time like a data burst, and generally speaking, when there is no data to be communicated, a carrier wave is not transmitted from the master station of the LAN system, still less a data frame. For this reason, in the present invention, a control frame is transmitted from the control frame transmitting unit 2 of a satellite station to the master station. In the master station 6, when the master station receives the control frame, the master station starts to transmit only a carrier wave from the carrier wave transmitting unit 5. In the satellite station 4, while this carrier wave is being transmitted, such a directivity characteristic of antenna unit 1 that the receiving electric field intensity of the carrier wave becomes a maximum, is determined by the antenna directivity characteristic control unit 3.

In the present invention, when the antenna unit 1 is composed of an active phased planar-array antenna, the directivity characteristic of the antenna unit 1 of the satellite station can also be made broad by transmitting the control frame using only one element out of a plurality of elements in the array of an active phased planar-array antenna, when the satellite station is transmitting the control frame using the control frame transmitting unit 2. Further, in this case, by increasing the power feeding power for one element used for transmitting the control frame, the radiating power of the control frame can never be less than the radiating power in the case where all elements are used, and the control frame can be transmitted to the master station without fail.

Furthermore, in the present invention, after such a directivity characteristic that the receiving electric field intensity in the satellite station of a carrier wave transmitted from the master station may become a maximum, is determined, and the directivity characteristic of the antenna unity 1 is fixed to that direction, a data frame is started to be transmitted and received between the master station and the satellite station. After that an antenna directivity characteristic is determined again, if necessary.

For example, when an error is detected in the data frame received from the master station, such as a frame check sequence error, or the number of the detected error frames exceeds a predetermined number, by the control frame transmitting unit 2 transmitting the control frame, by the carrier wave transmitting unit 5 starting to transmit a carrier wave and the antenna directivity characteristic control unit 3 determining a directivity characteristic, the communication quality of a wireless LAN can be optimized again.

FIG. 2 shows the basic configuration of a wireless LAN system of the present invention. For example, in FIG. 2 a wireless LAN system comprises a wireless LAN master station 12 connected to a wired backbone LAN 11, and a plurality of wireless LAN satellite stations 15 connected to data terminals 14 respectively. The antenna of the wireless LAN master station 12 has a broad radiating directivity characteristic 13, whereas the satellite station antennae 16 of the wireless LAN satellite stations 15 have an acute radiating directivity characteristic 17.

Since, general speaking, data is often transmitted like a burst in a LAN system, the wireless LAN master station 12 does not transmit a carrier wave when there is no data to be transmitted. Therefore, in this embodiment, when the satellite station 15 starts to operate, a connected data terminal 14 such as a personal computer starts to operate or the data terminal 14 starts to communicate, the satellite station 15 transmits a control frame different from a normal LAN data frame to the master station 12, the master station receives the control frame and starts to transmit only a carrier wave. The antenna 16 of the satellite station 15 is provided by an active phased planar-array antenna. The satellite station 15 determines such a direction where a carrier wave transmitted from the master station can be received with the maximum intensity, and good communication quality can be secured by conforming the direction of a radiating beam of an antenna, that is, the radiating directivity characteristic, to the determined direction.

In FIG. 2, equipment in various forms such as PC card type, terminal built-in type, set top type, etc., is used for wireless LAN site station 15. There are also an antenna 16 incorporated satellite station, and a satellite station 15 with an antenna 16 connected by a signal wire. There is no restriction in the configuration and form of a satellite station 15 and an antenna 16.

Furthermore, as for the antenna 16 one antenna can be used for both transmission and reception, or different antennae can be used for transmission and reception. In this embodiment it is assumed that different antennae are used for transmission and reception, and different frequencies are used for transmission and reception.

Figure 3:
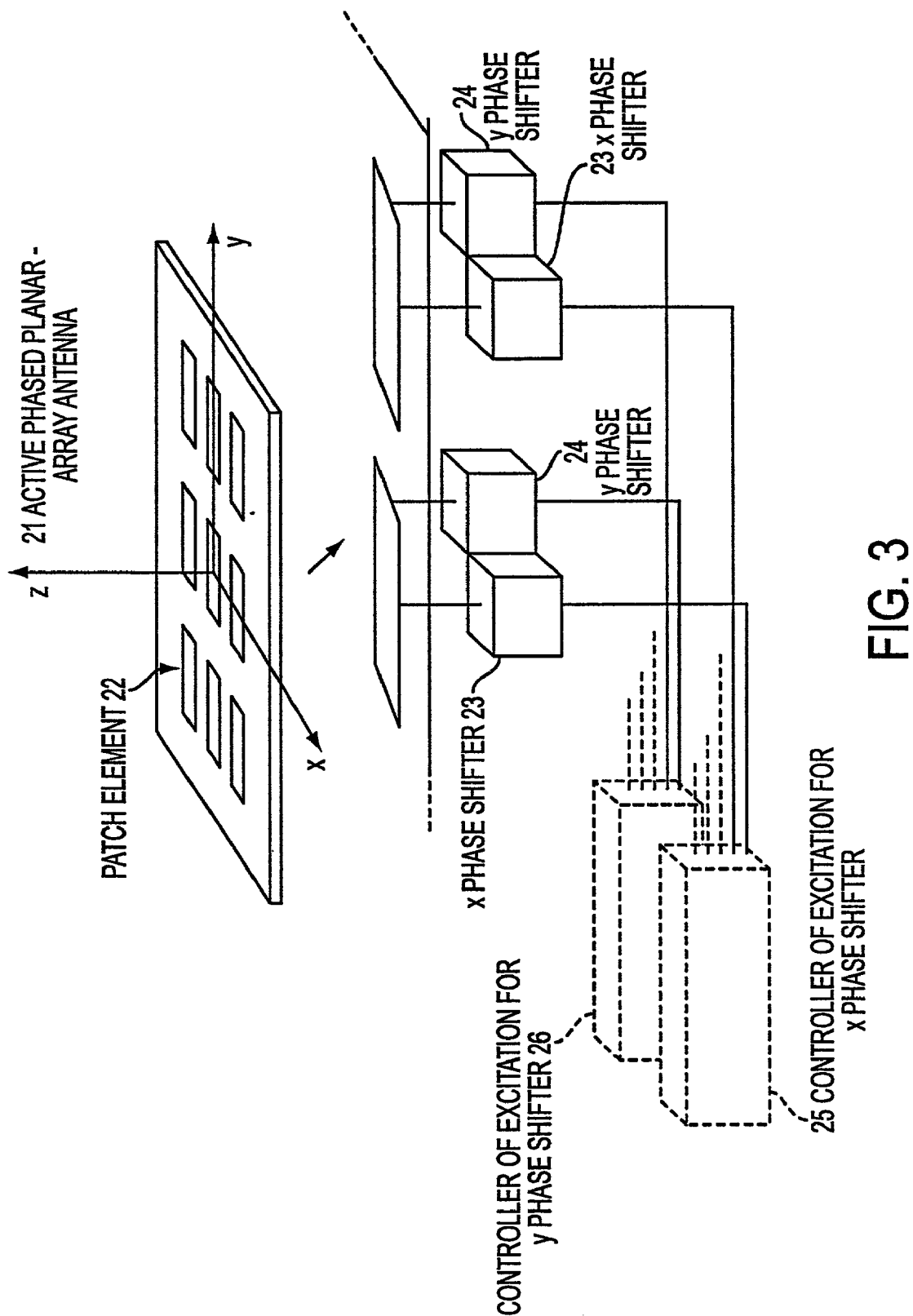
FIG. 3 shows an active phased planar-array antenna as an example of an antenna for a satellite station.

FIG. 3 shows an active phased planar-array antenna as an example of an antenna for a satellite station 16 shown in FIG. 2. In the drawing, an active phased planar-array antenna 21 is composed of a plurality, 9 in this embodiment, of patch elements 22. A x phase shifter 23 and a y phase shifter 24 are provided corresponding to each patch element 22. The x phase shifter 23 changes a power feeding phase to a side parallel to the y axis of a patch element in order to change the directivity characteristic on a x-z plane, and the y phase shifter 24 changes a power feeding phase to a side parallel to the x axis. To each x phase shifter 23 and each y phase shifter 24 are connected an excitation controller 25 of the x phase shifter and an excitation controller 26 of the y phase shifter, respectively.

Although an antenna array of an active phased planar-array antenna 21 is composed of 9 patch elements shown in FIG. 3, the number of elements is not limited to this. Furthermore, although the shape of an element is a square, the shape of the element can be any form, such as a form in which one pair of the opposite angles of a square is cut, a circle, di-pole type, etc.

Figure 4:
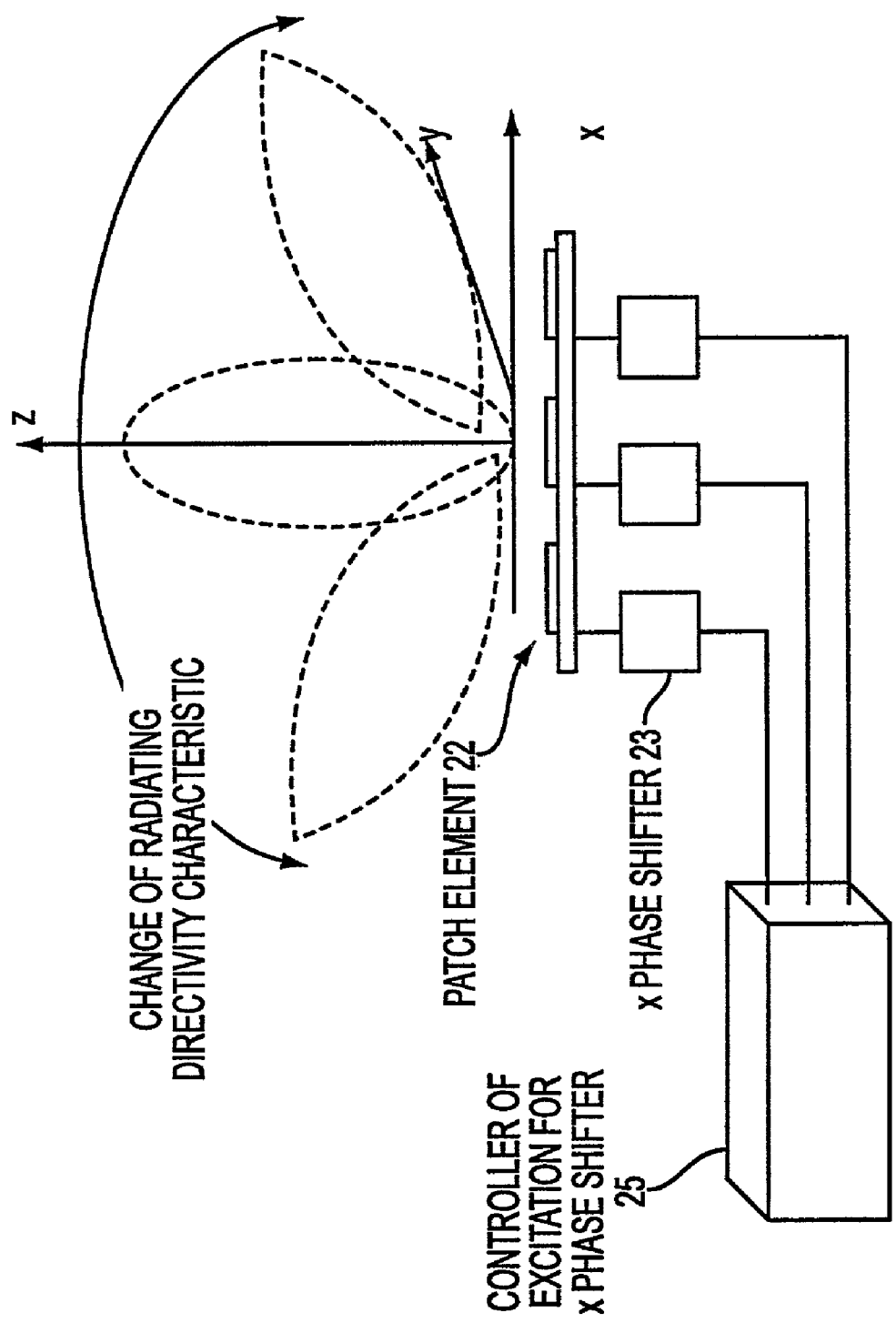
FIG. 4 shows the change of radiating directivity characteristic of an active phased planar-array antenna.

FIG. 4 shows the change of the radiating directivity characteristic of an active phased planar array antenna in the case where the antenna is seen from the y direction. In the drawing it is seen that the direction of the radiating directivity characteristic of the entire antenna changes on a x-z plane by controlling the x phase shifter 23 corresponding to each patch element 22.

Figure 5:
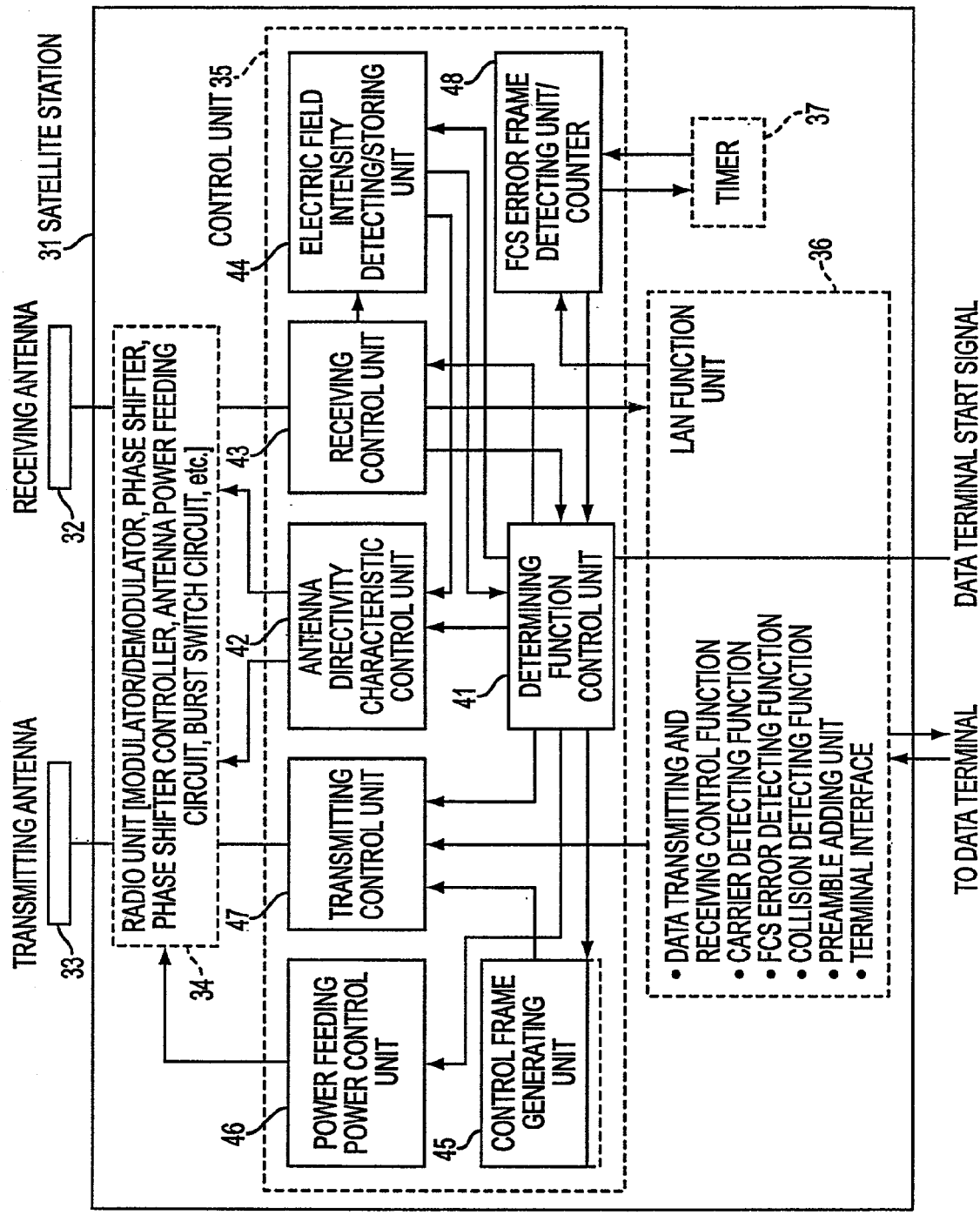
FIG. 5 is a block diagram showing the configuration of a wireless LAN satellite station.

FIG. 5 is a block diagram of the configuration of a satellite station. In the drawing a satellite station 31 is connected with a receiving antenna 32 and a transmitting antenna 33. The satellite station roughly comprises a radio unit 34, a control unit 35, a LAN function unit 36 and a timer 37.

The radio unit 34 is connected with the receiving antenna 32 and a transmitting antenna 33, and comprises a modulator/demodulator, a phase shifter, a phase shifter controller, an antenna power feeding circuit, a burst switch circuit, etc.

The LAN function unit 36 comprises a data transmitting and receiving control function, a carrier detecting function, an FCS (frame check sequence) error detecting function, a collision detecting function, a preamble adding function, a terminal interface, etc.

The control unit 35 comprises a determining function control unit 41, an antenna directivity characteristic control unit 42, a receiving control unit 43, an electric field intensity detecting/storing unit 44, a control frame generating unit 45, a power feeding power control unit 46, a transmitting control unit 47 and an FCS error frame detecting unit/counter 48.

Figure 6:
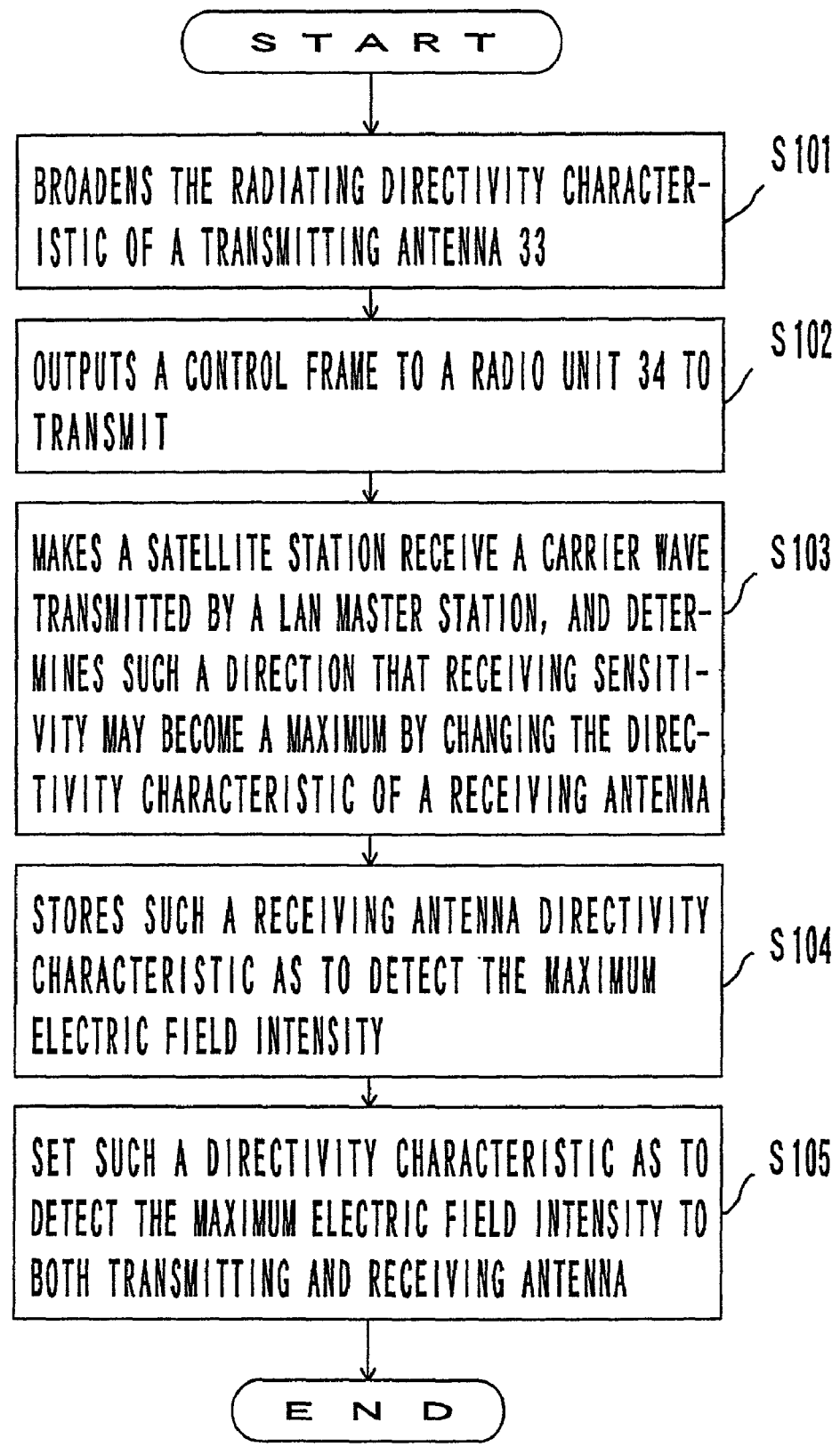
FIG. 6 is a flowchart of an optimizing process of basic communication quality executed by the control unit shown in FIG. 5.

FIG. 6 is a flowchart of the optimizing process of basic communication quality executed by a control unit 35 shown in FIG. 5.

First, in step S101, an antenna directivity characteristic control unit 42 receives an instruction to start to determine from the detecting function control unit 41, and instructs the radio unit 34 to use only one patch element out of a plurality of patch elements composing an active phased planar-array antenna being the transmitting antenna 33 to broaden the radiating directivity characteristic of the transmitting antenna 33.

In step S102 the transmitting control unit 47 outputs a control frame generated by the control frame generating unit 45 to the radio unit 34 to make the radio unit 34 transmit the control frame.

In step S103 the receiving control unit 43 makes the radio unit 34 receive a carrier wave transmitted from the master station when the master station receives the control frame, and the antenna directivity characteristic control unit 42 determines such a directivity characteristic that a carrier wave with the maximum intensity may be received while changing the directivity characteristic of the receiving antenna 32.

In step S104 the electric field intensity detecting storing unit 44 stores such a directivity characteristic of the receiving antenna that the receiving electric field intensity may become a maximum.

In step S105 the antenna directivity characteristic control unit 42 instructs the radio unit 34 so that the receiving antenna 32 and the transmitting antenna 33 may have such a directivity that the receiving electric field intensity stored in the electric field intensity detecting storing unit 44 may become a maximum, and terminates the optimizing process. The configuration of the control unit 35 is described in detail below.

Figure 7:
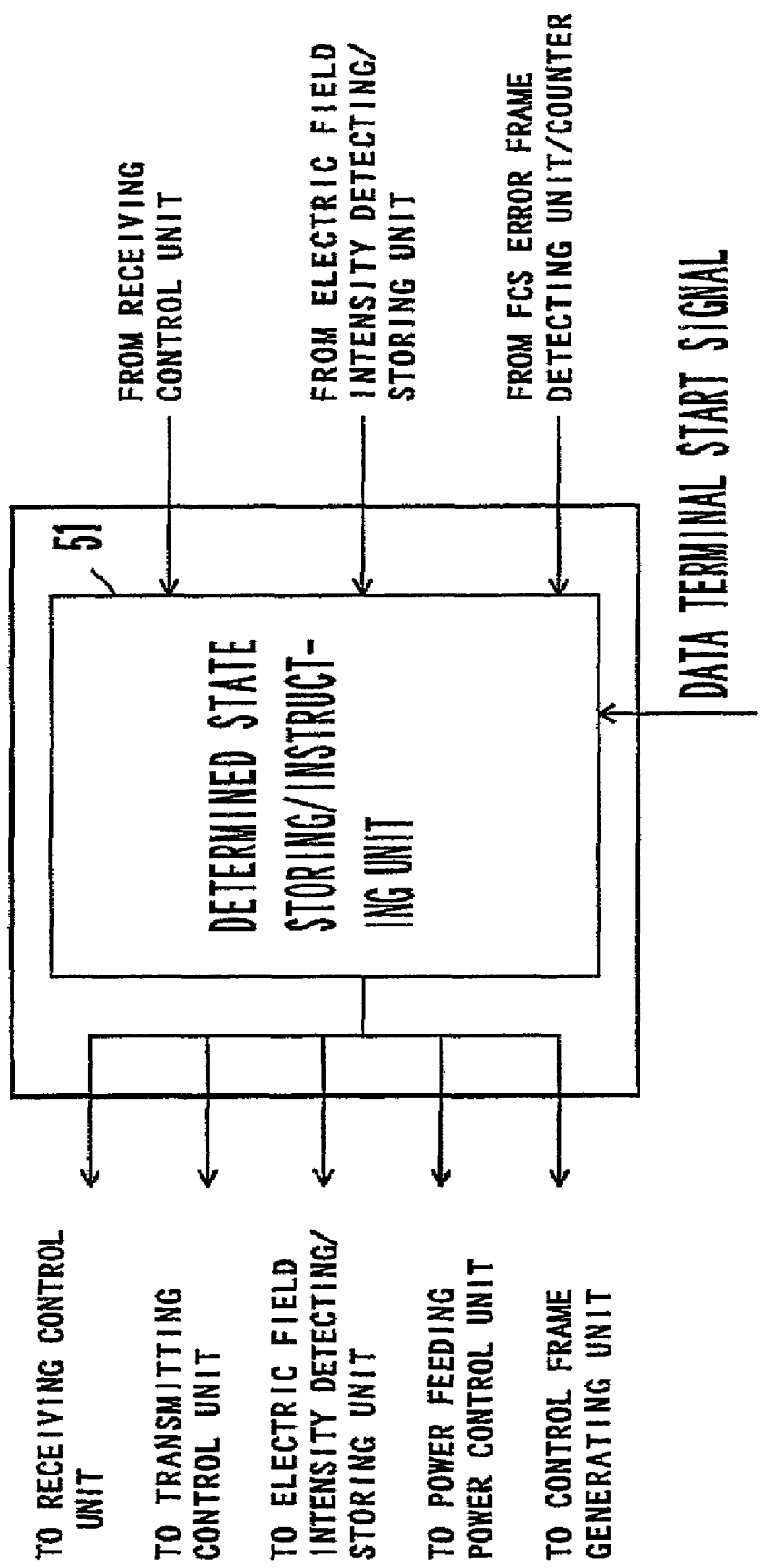
FIG. 7 shows the configuration of the determining function control unit shown in FIG. 5.

FIG. 7 shows the configuration of the determining function control unit shown in FIG. 5.

In the drawing, the determining function control unit 41 comprises the determined state storing/instructing unit 51. For example, when an error is detected upon receiving a control frame returned from the master station, when the electric field intensity of a carrier wave received from the master station is detected and found not to meet the requirements described later by the electric field intensity detecting/storing unit 44, when errors are frequently detected in normal data frames by the FCS error frame detecting unit/counter 48, and when a data terminal start signal is input, the determined state storing/instructing unit 51 sends a signal for instructing to start to determine to the control frame generating unit 45, etc.

Figure 8:
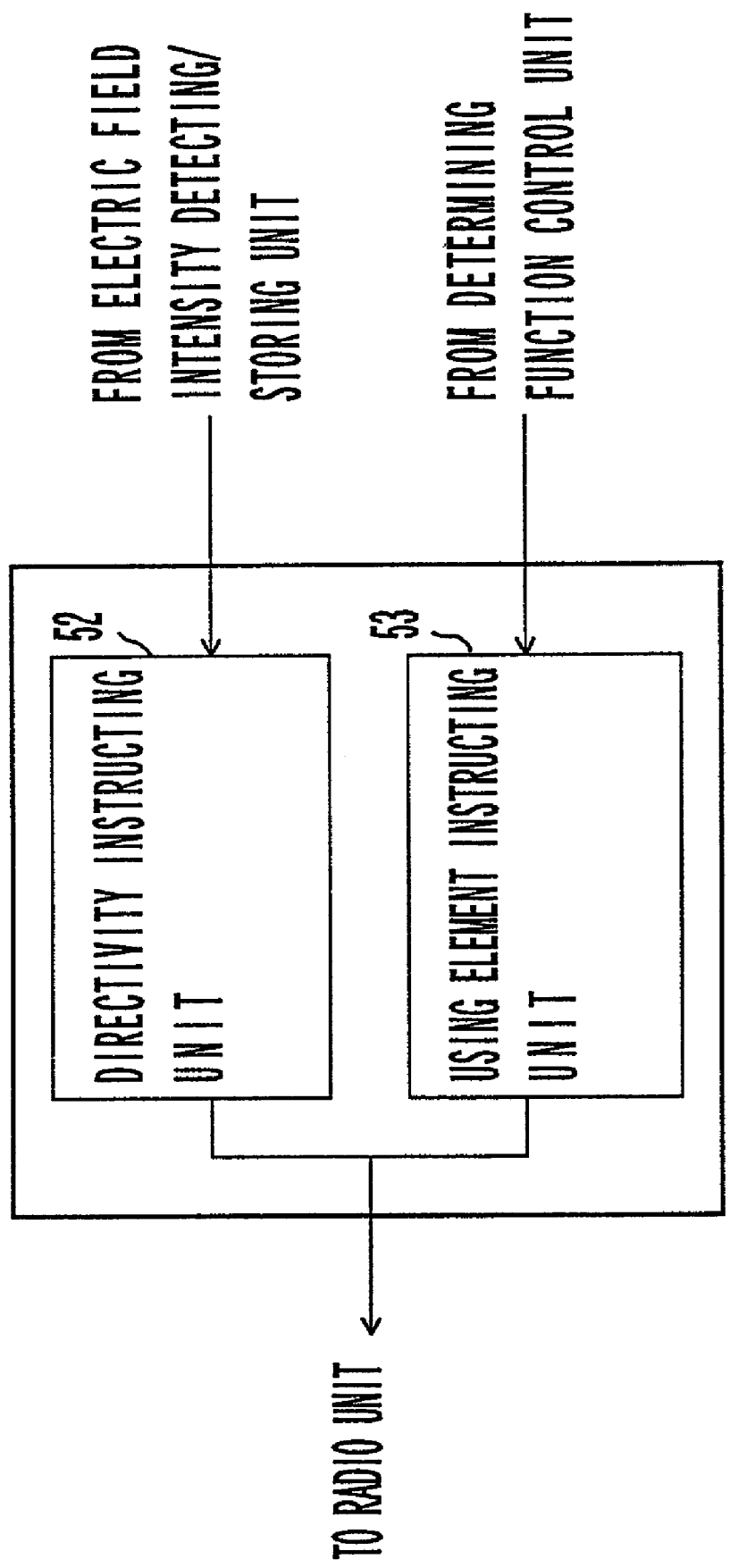
FIG. 8 shows the configuration of an antenna directivity characteristic control unit.

FIG. 8 shows the configuration of an antenna directivity characteristic control unit. In the drawing, the antenna directivity characteristic control unit 42 comprises a directivity 20 instructing unit 52 and a using element instructing unit 53.

The control by the antenna directivity characteristic control unit is further described below. As mentioned before, in a LAN satellite station, an active phased planar-array antenna the radiating directivity characteristic of which can be freely changed consecutively is used for reception. As explained in FIG. 4, the direction of the radiating directivity characteristic can be freely changed on a x-z plane by changing a power feeding phase for a patch element 22 using a phase shifter corresponding to each patch element 22. The same applies to a x-y plane. Therefore, the direction of the radiating directivity characteristic can be freely changed on a hemispherical plane of an antenna plane by changing each power feeding phase using a x phase shifter 23 and a y phase shifter 24.

The active phased planar-array antenna is further described below. This antenna is an antenna on a dielectric base plate on which a plurality of antenna elements, that is, patch elements, are two dimensionally (on a plane) arrayed. Each patch element is provided with a phase shifter, and the radiating direction of electromagnetic waves, that is radiating directivity characteristic, can be actively changed without changing the physical direction of an antenna by changing the phase of excitation of a respective patch elements consecutively using the phase shifters. This antenna is, for example, used for radar, etc. An antenna with an acute radiating directivity characteristic is also configured by arraying many patch elements. On the contrary, abroad radiating directivity characteristic having a half power angle of 90 to 120 degrees or more can also be realized.

Figure 9:
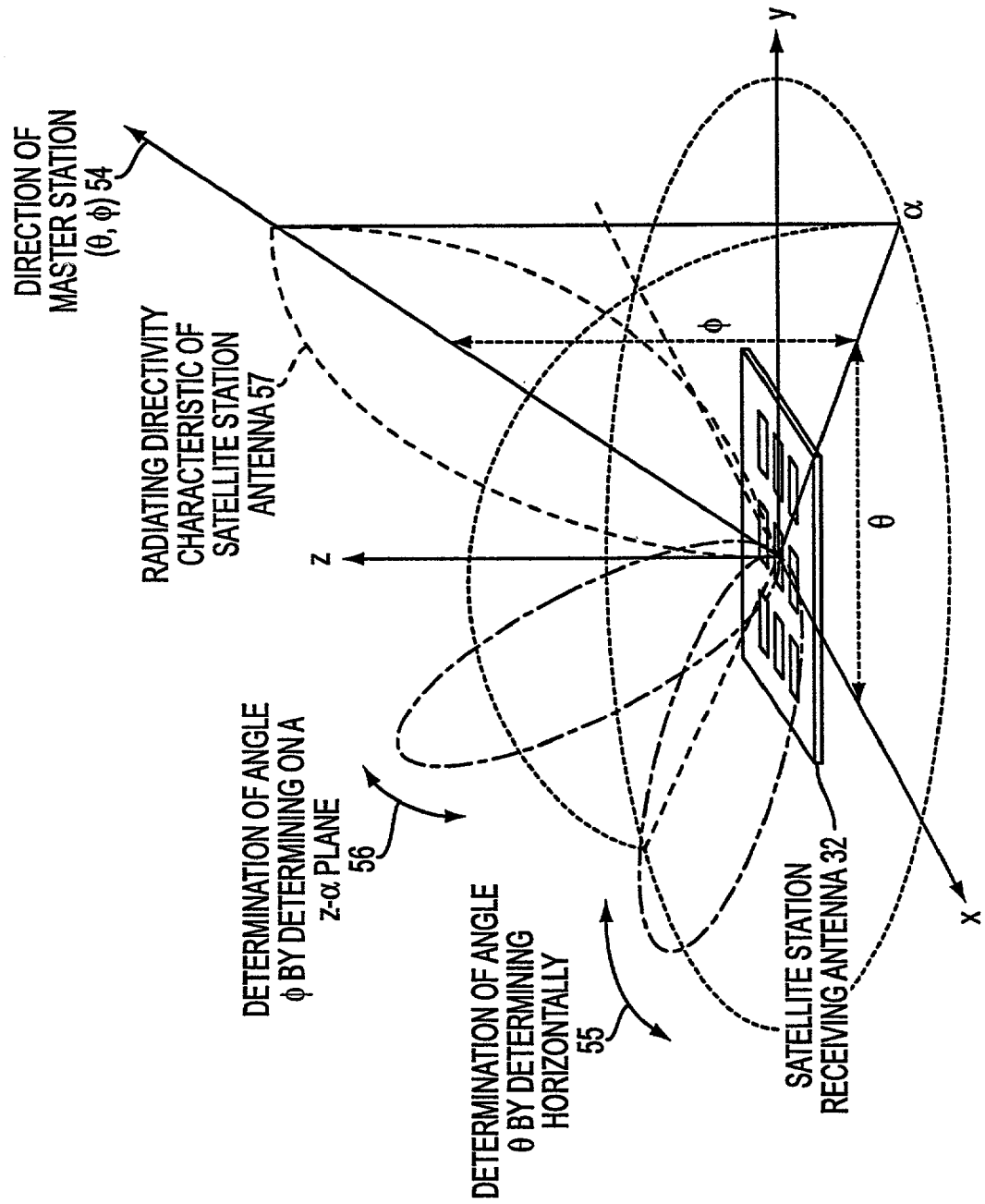
FIG. 9 shows a method for determining an antenna radiation directivity characteristic of a satellite station.

FIG. 9 shows a method for determining an antenna radiation directivity characteristic of a satellite station, that is, a method of determining the direction of the master station. As explained in FIG. 3, on the satellite station receiving antenna 32, nine patch elements are two-dimensionally arrayed, the satellite station receiving antenna 32 has an acute radiating directivity characteristic, and the satellite station receiving antenna determines so that the radiating directivity characteristic may be directed to the master station (54).

Figure 10:
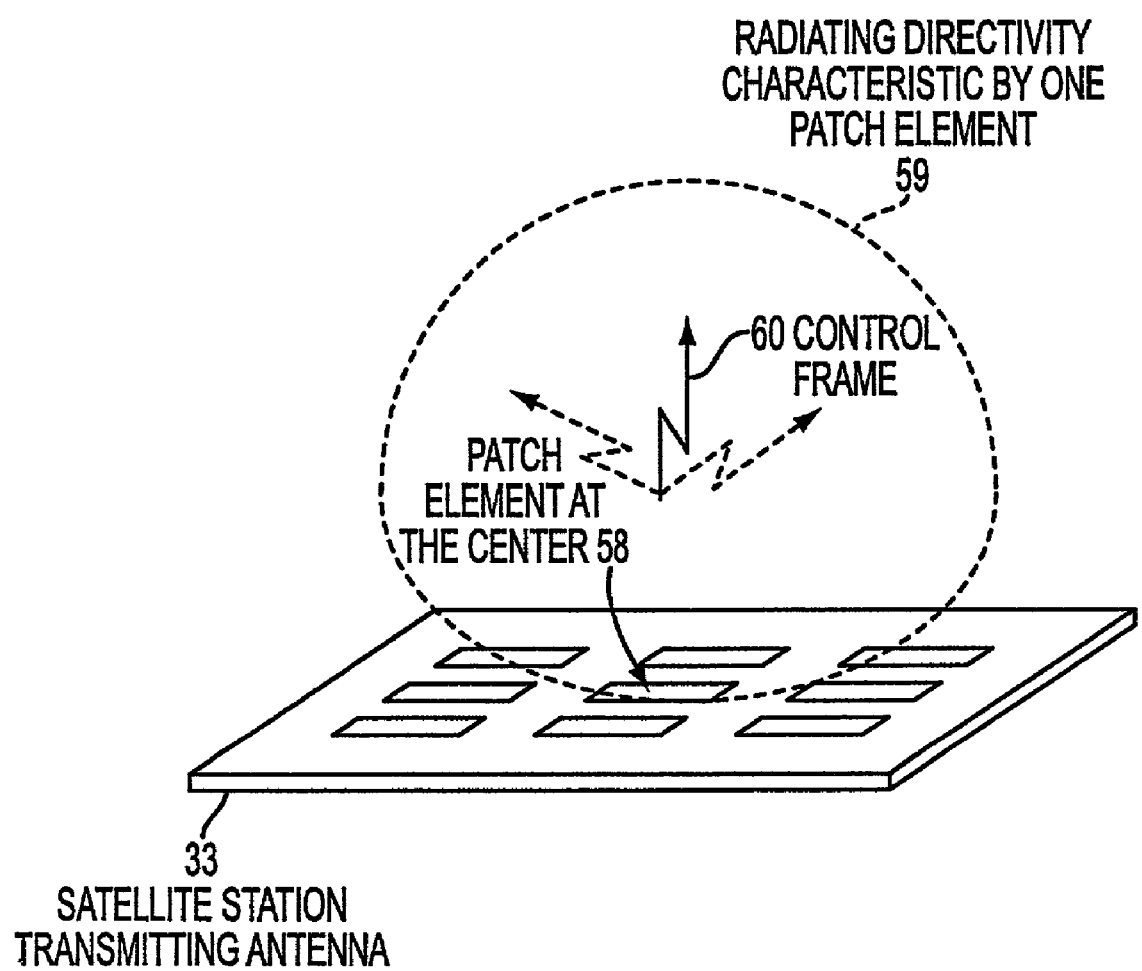
FIG. 10 shows a method for sending a control frame to the master station prior to the determination of an antenna radiation directivity characteristic.

First, angle θ is decided by shifting the radiating directivity characteristic on an x-y plane, that is, determining horizontally (55). Then, angle φ is decided by determining on a z-a plane (56). Thus, the radiating directivity characteristic of the satellite station antenna 57 is directed to the master station (54). FIG. 10 shows a method for sending a control frame to the master station prior to the determination of an antenna radiation directivity characteristic.

In the drawing, a control frame is sent to the master station using out of a plurality of patch elements composing the satellite station transmitting antenna 33, for example, only a patch element at the center 58. In this case, the radiating directivity characteristic of the satellite station 59 is made broad by using only one patch element, and the control frame 60 is transmitted in a broad direction. Thus, in whichever direction the master station is located, the master can receive the control frame.

The directivity instructing unit 52 shown in FIG. 8 stores the values of θ and φ being the result of the determination of an antenna directivity characteristic, reports the values to the radio unit 34, and fixes the radiating directivity characteristic of both the transmitting antenna 33 and the receiving antenna 32. That is, at the time of normal data communication, both antenna for transmission and reception are directed to the direction decided by the optimal values of a θ and φ. When the using element instructing unit 53 receives a determination start instructing signal from the determining function control unit 41, the using element instructing unit 53 reports to the radio unit 34 an instruction to transmit a control frame using only one element of the transmitting antenna 33.

Figure 11:
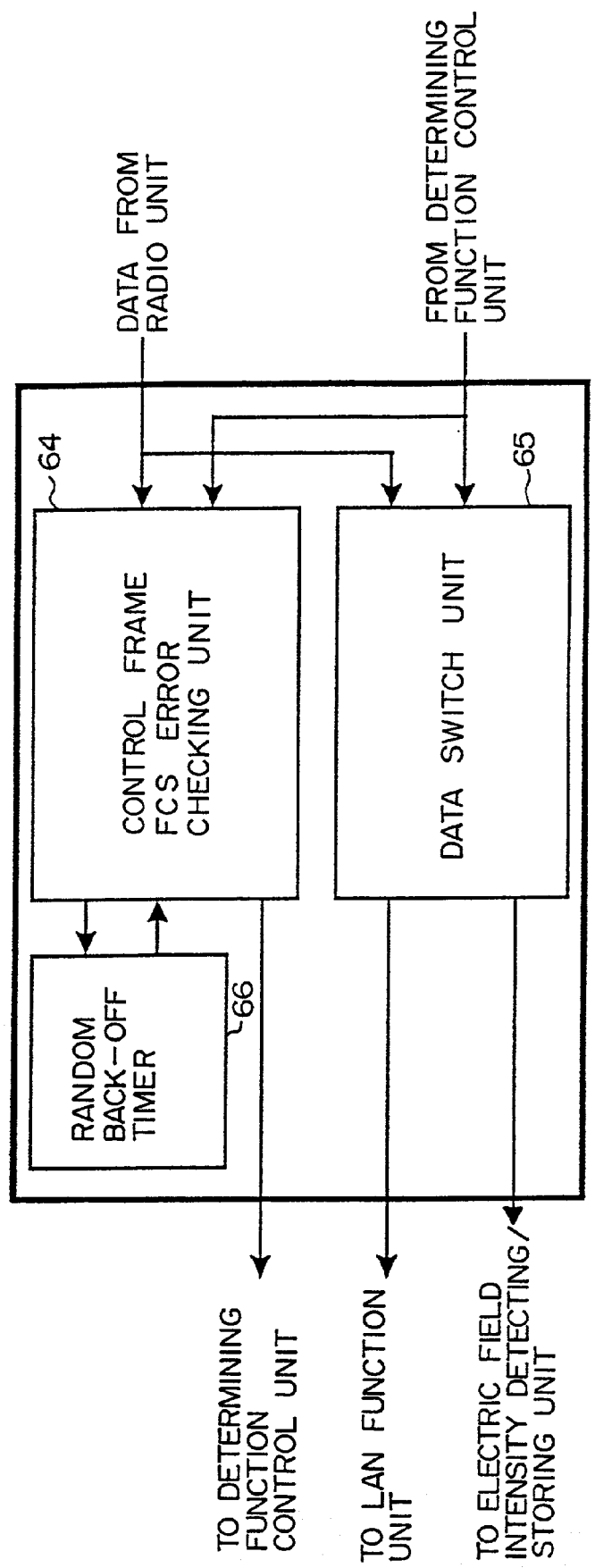
FIG. 11 shows the configuration of the receiving control unit shown in FIG. 5.

FIG. 11 shows the configuration of the receiving control unit shown in FIG. 5. In the drawing, the receiving control unit 43 comprises a control frame FCS error checking unit 64, a data switch unit 65 and a random back-off timer 66.

When the control frame FCS error checking unit 64 receives a data input from the radio unit 34 and detects an error in a control frame returned from the master station, the control frame FCS error checking unit 64 judges that a collision occurs with a normal data frame sent from another satellite station, and instructs the determining function control unit 41 to determine again after a random back-off time. At the time of the determination of an antenna direction and at the time of normal data frame communication, the data switch unit 65 performs a switch function to output a control frame as data to the electric field intensity detecting/storing unit 44, and to output data to both the LAN function unit 36 and the electric field intensity detecting/storing unit 44, respectively. The random back-off timer 66 is a timer for deciding a random back-off time for transmission until transmitting a control frame again after detecting a collision.

Figure 12:
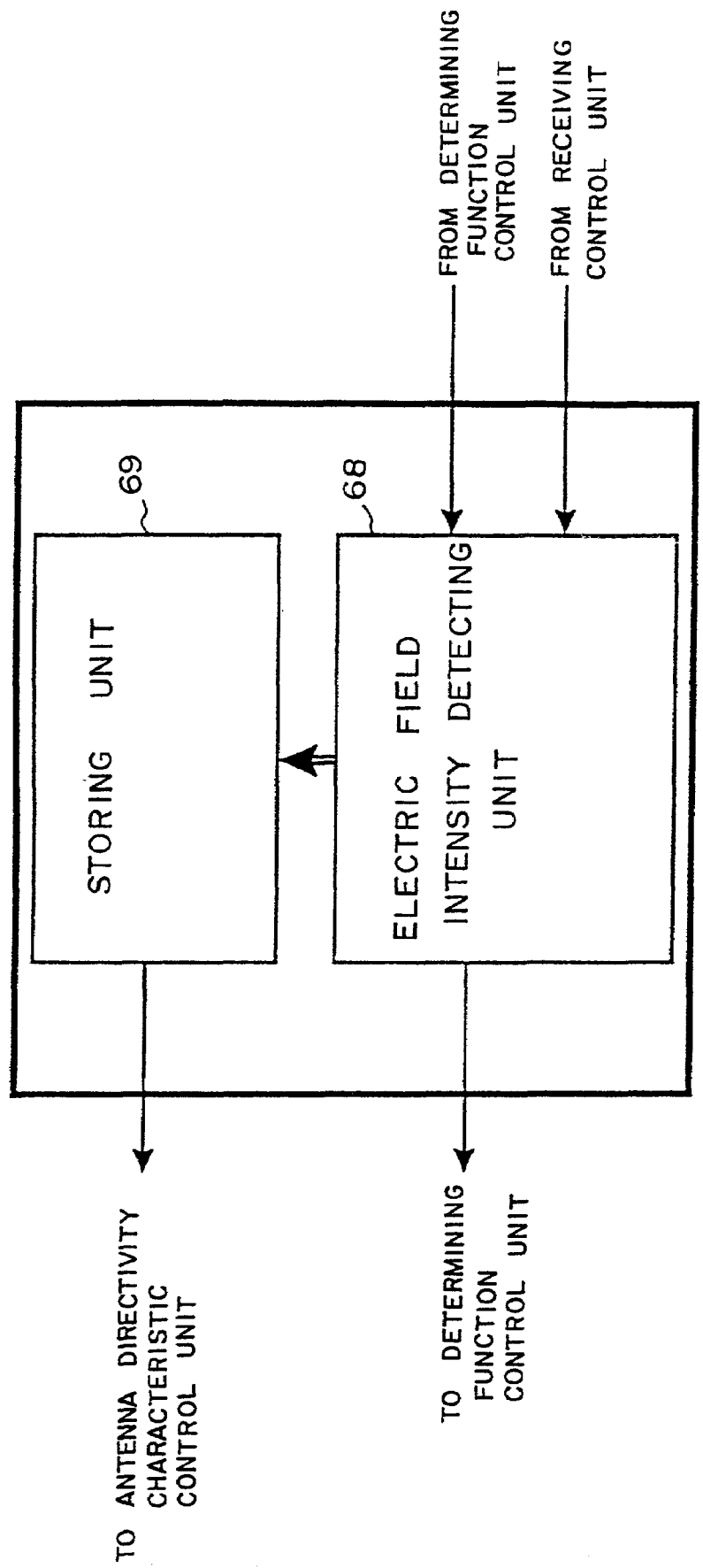
FIG. 12 shows the configuration of an electric field density detecting/storing unit.

FIG. 12 shows the configuration of an electric field density detecting/storing unit. In the drawing, the electric field intensity detecting/storing unit 44 comprises an electric field intensity detecting unit 68 and a storing unit 69.

When the electric field intensity detecting unit 68 determines an antenna direction, the electric field intensity detecting unit 68 detects the electric field intensity of a carrier wave transmitted from the master station, and reports to the storing unit 69 the angle of the radiating directivity characteristic at that time. When the detected electric field intensity is less than the predetermined threshold even if the angle of the radiating directivity characteristic is changed, the electric field intensity detecting unit 68 instructs the determining function control unit 41 to determine again.

At the time of normal data communication the electric field intensity detecting unit 68 monitors the receiving electric field intensity of a normal data frame, and when the value is less than the predetermined threshold, the electric field intensity detecting unit 68 instructs the determining function control unit 41 to determine the directivity characteristic of the antenna again in the same way.

The storing unit 69 receives an output from the electric field intensity detecting unit 68, stores the values of θ and φ when the maximum detected receiving strength is more than the predetermined minimum value, that is, a threshold, reports the values to the antenna directivity characteristic control unit 42, and fixes the antenna directivity characteristic to the direction of the θ and φ.

Figure 13:
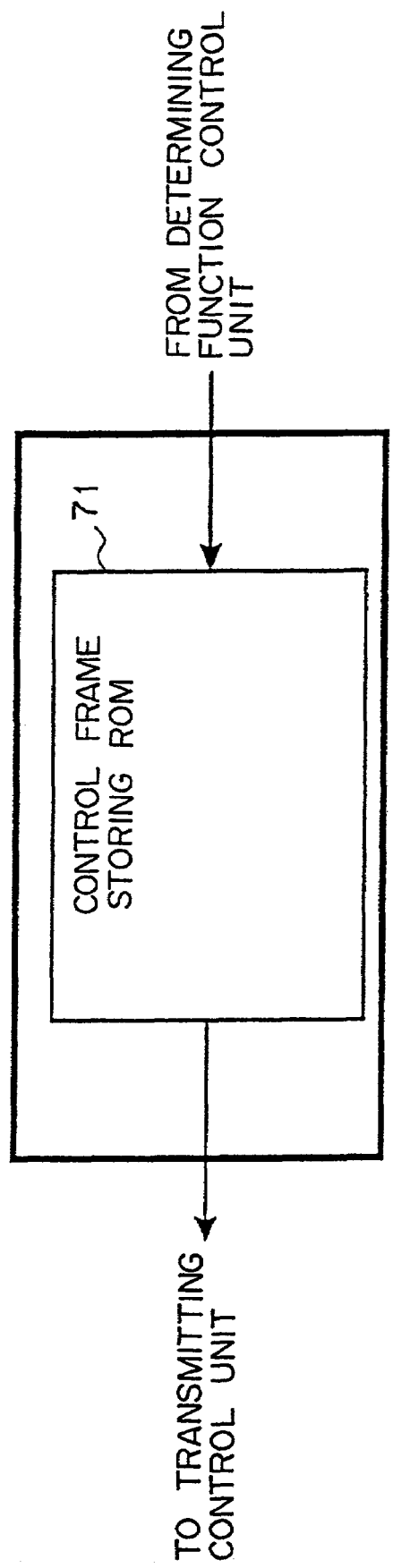
FIG. 13 shows the configuration of a control frame generating unit.

FIG. 13 shows the configuration of a control frame generating unit 45. In the drawing a control frame memory ROM 71 receives an instruction to start to determine from the determining function control unit 41, and outputs the control frame stored in the ROM to the transmitting control unit 47.

Figure 14:
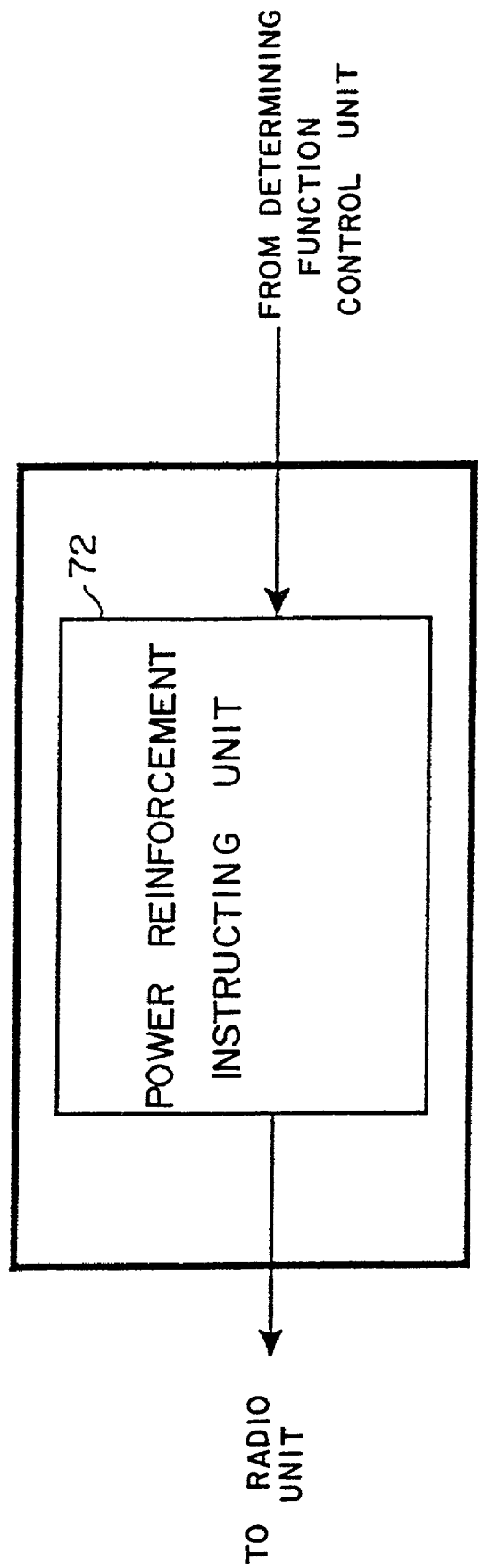
FIG. 14 shows the configuration of the power feeding power control unit shown in FIG. 5.

FIG. 14 shows the configuration of a power feeding power control unit 46. In the drawing a power reinforcement instructing unit 72 receives an instruction to start to determine from the determining function control unit 41, sends an instruction to increase feeding power to only an antenna used for transmitting a control frame, that is, one patch element, to the radio unit 34, and instructs to restore the feeding power to normal after transmitting the control frame. As explained in FIG. 10, this is because when transmitting a control frame, only one patch element is used in order to broaden the radiating directivity characteristic, the radiating power of an antenna becomes small, and therefore the feeding power for the patch element is increased.

Figure 15:
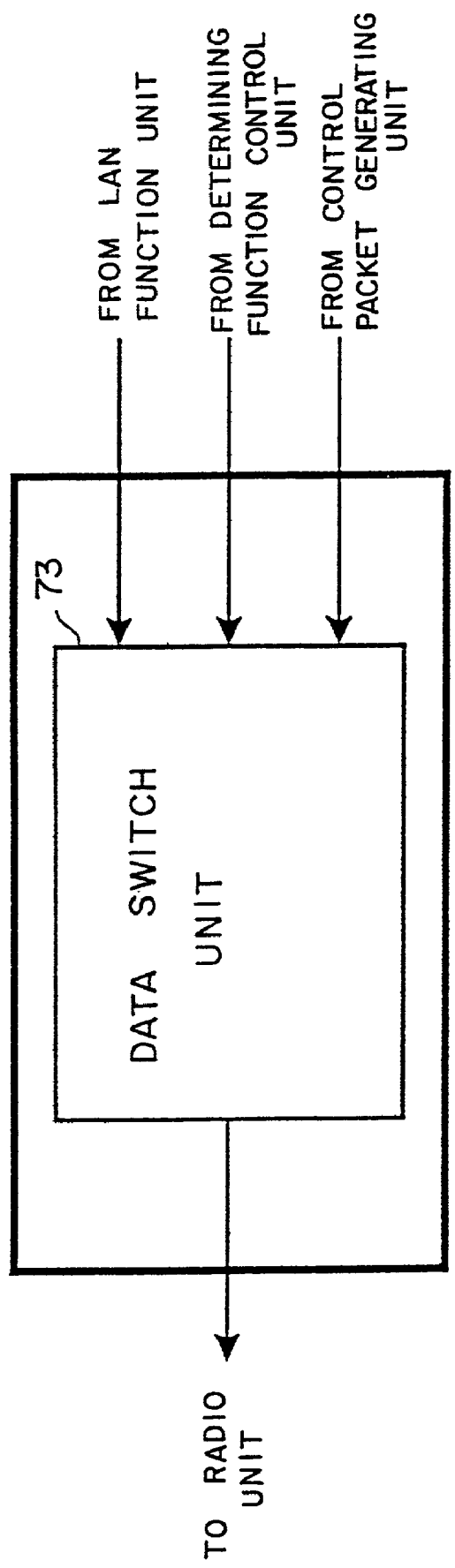
FIG. 15 shows the configuration of a transmitting control unit.

FIG. 15 shows the configuration of a transmitting control unit 47. In the drawing, a data switch unit 73 performs a switch function, that is, when a satellite station determines an antenna directivity characteristic according to an instruction from the determining function control unit, the data switching unit 73 sends a control frame input from the control frame generating unit 45 to the radio unit 34, and at the time of normal data communication executes a switching function to send a normal data frame from the LAN function unit 36 to the radio unit 34.

Figure 16:
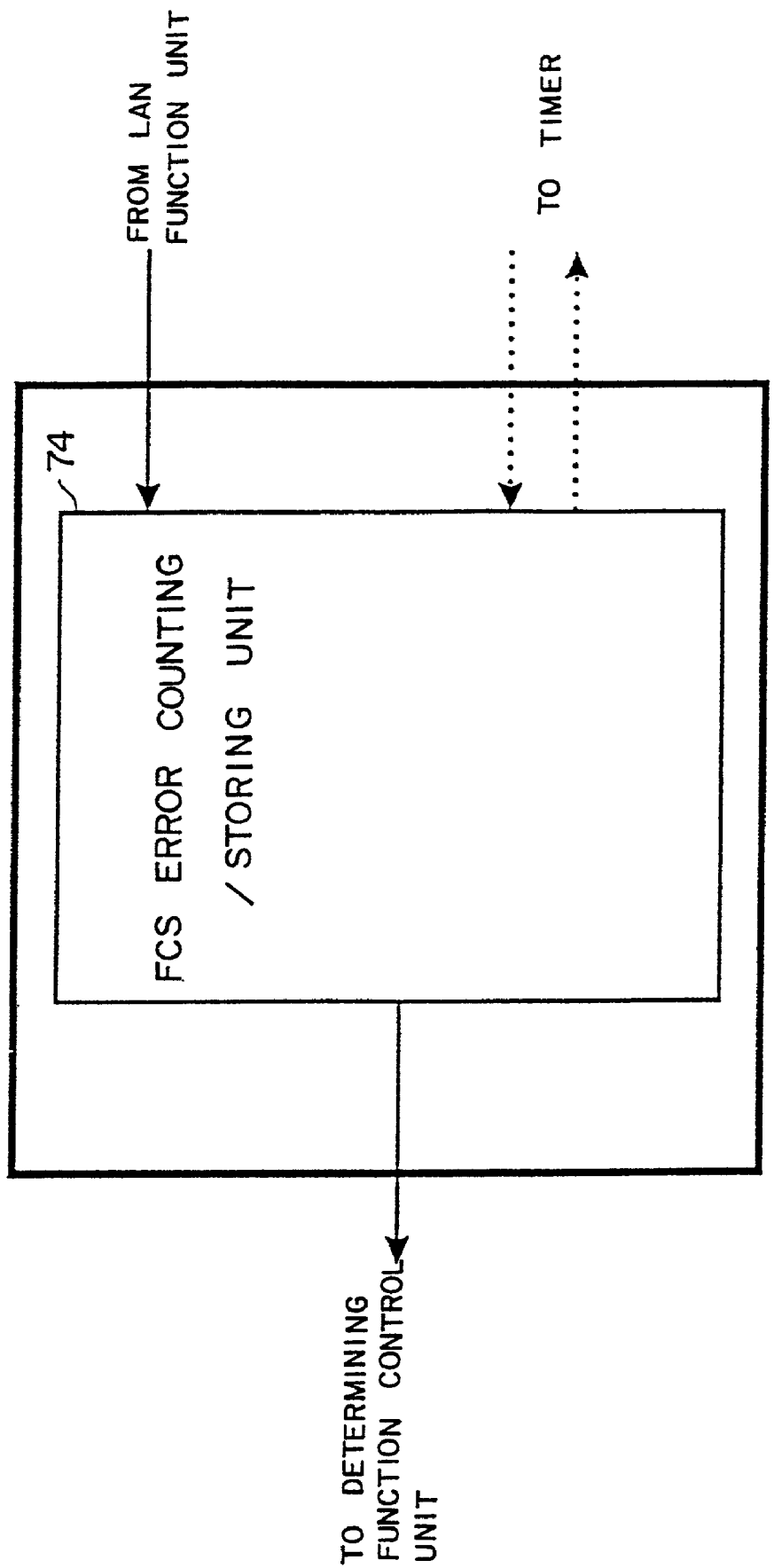
FIG. 16 shows the configuration of an FCS error frame detecting unit/counter.

FIG. 16 shows the configuration of an FCS error frame detecting unit/counter 48. In the drawing an FCS error counter/storing unit 74 receives an input from the LAN function unit 36, at the time of normal data communication counts the number of data frames in which an error is detected by the LAN function unit 36, and for example, when receives in succession a predetermined number of error frames, the FCS error frame detecting unit/counter 48 instructs the determining function control unit 41 to start determining.

Further, when an error frame is first received, the FCS error counting/storing unit 74 issues an instruction to start to the timer 37, and when it receives the number of error frames predetermined before the time-out, instructs to start to determine to the determining function control unit 41. This operation is further described later.

Figure 17:
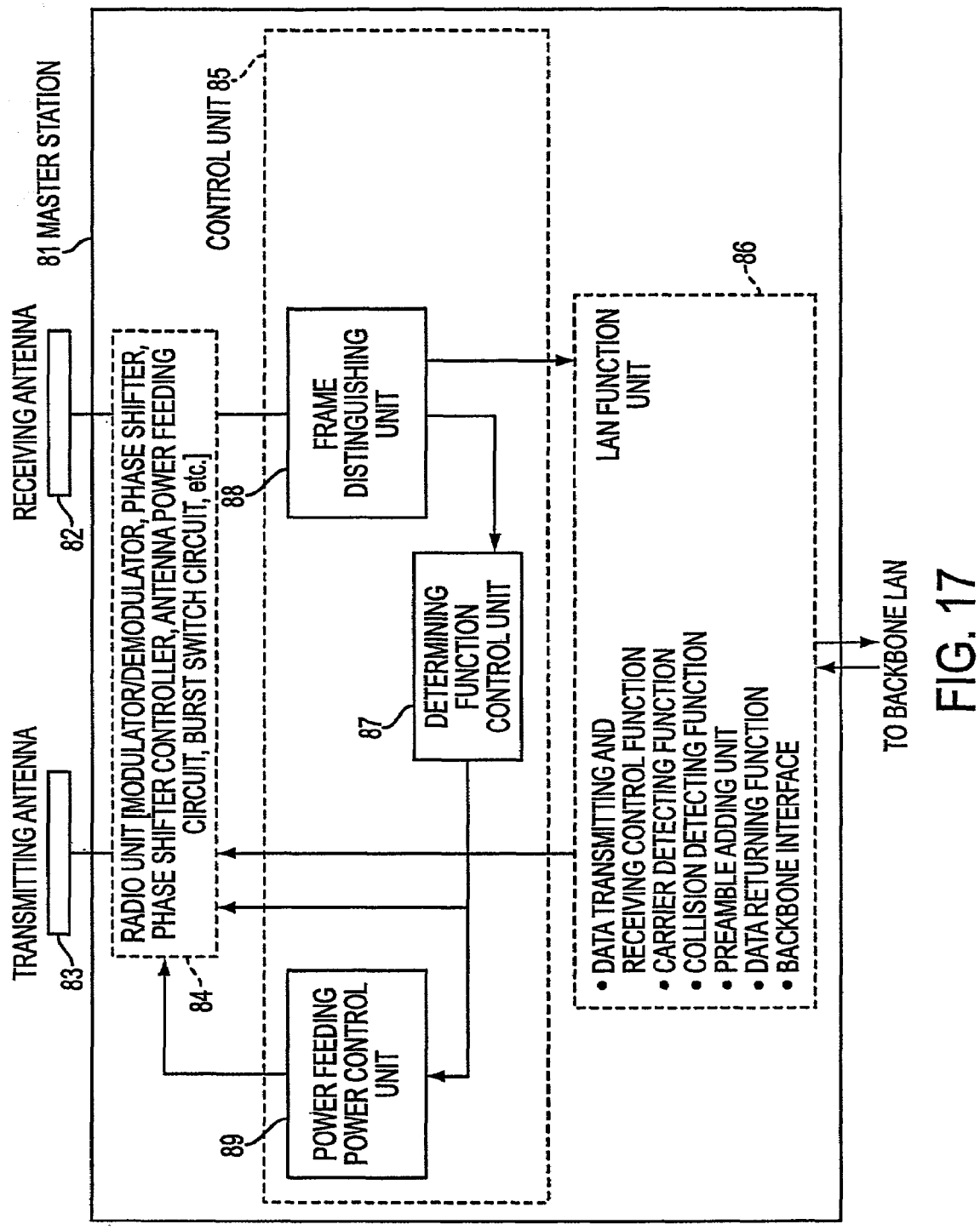
FIG. 17 is a block diagram showing the configuration of a wireless LAN master station.

FIG. 17 is a block diagram showing the configuration of a wireless LAN master station. In the drawing, a receiving antenna 82 and a transmitting antenna 83 are connected to the master station 81. The master station roughly comprises a radio unit 84, a control unit 85 and a LAN function unit 86.

The radio unit 84 comprises a modulator/demodulator, a phase shifter, a phase shifter controller, an antenna power feeding circuit, a burst switch circuit, etc. The control unit 85 comprises a determining function control unit 87, a frame distinguishing unit 88 and a power feeding power control unit 89. Furthermore, the LAN function unit 86 comprises a data transmitting/receiving control function, a carrier wave detecting function, a collision detecting function, a preamble adding function, a data returning function and a backbone interface, etc.

Figure 18:
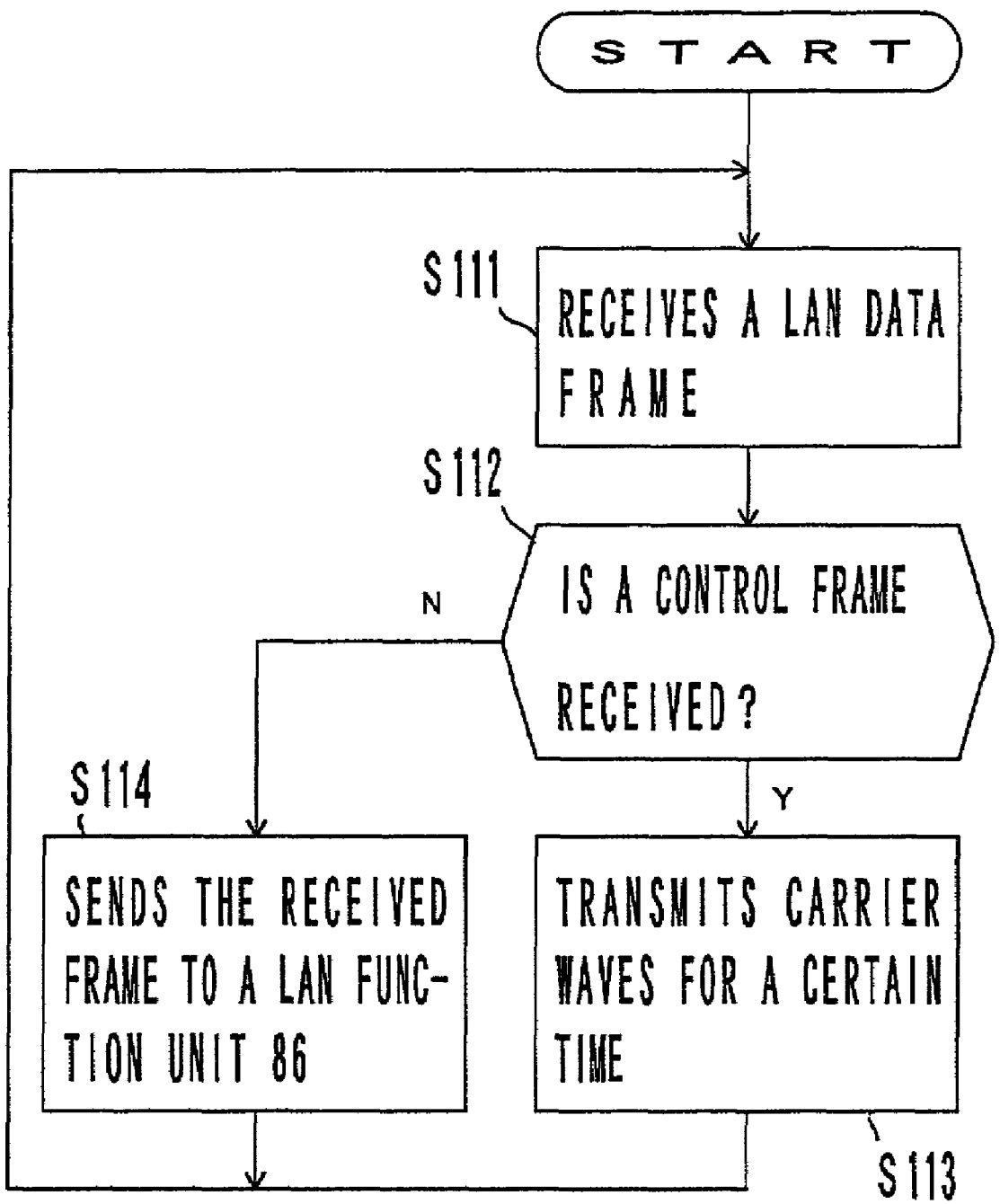
FIG. 18 is a basic flowchart of processes executed by the control unit shown in FIG. 17.

FIG. 18 is a basic flowchart of processes executed by the control unit 85 shown in FIG. 17.

First, in step S111 the radio unit 84 receives a frame transmitted by a satellite station 31, and the frame is input to the frame distinguishing unit 88.

In step S112 the frame distinguishing unit 88 judges whether or not a received frame is a control frame, and if so, the flow proceeds to step S113. If the received frame is not a control frame, the flow proceeds to step S114, and the frame is output to the LAN function unit 86 to make the LAN function unit transfer the frame to a backbone LAN, and then the flow returns to step S111.

In step S113 the determining function control unit 87 instructs the radio unit 84 to transmit a carrier wave from the transmitting antenna 83 while a satellite station is determining the directivity characteristic of an antenna, and then the flow returns to step S11. At this time, the power feeding power control unit 89 controls the feeding power of the radio unit 84 so that the satellite station may obtain an electric field intensity sufficient to determine the directivity characteristic of the antenna.

Each of units composing the control unit 85 is further described in detail below.

Figure 19:
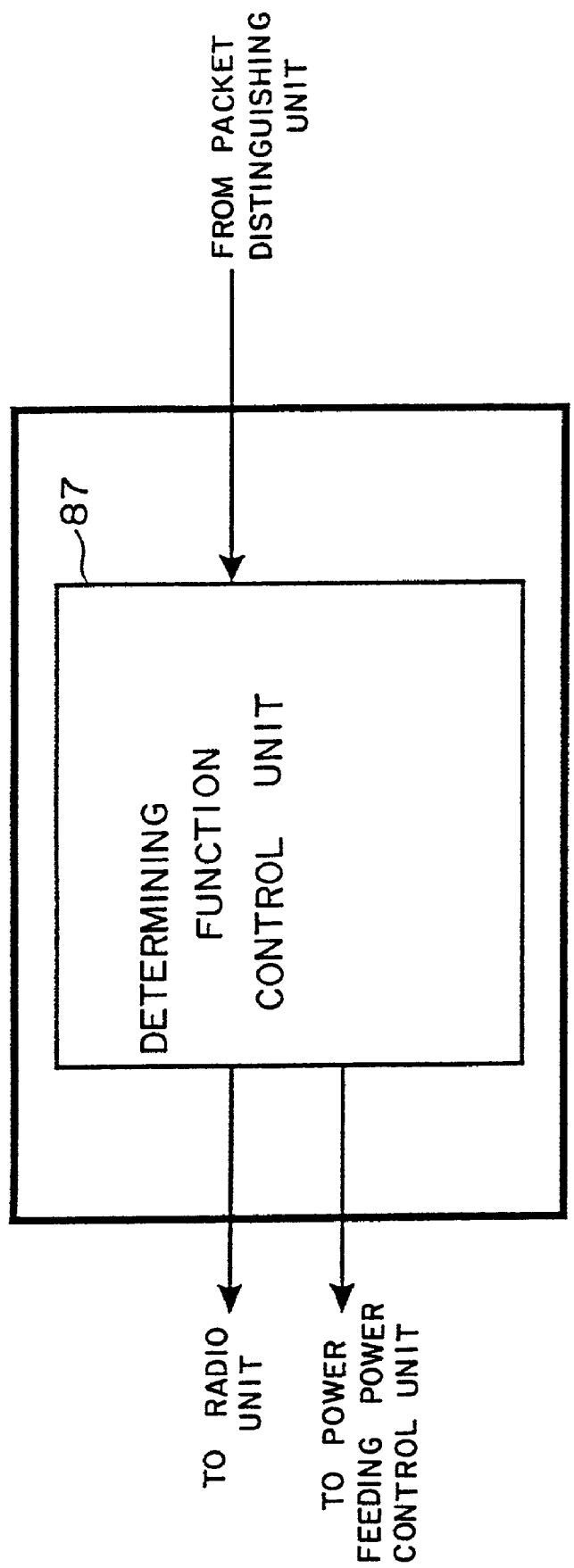
FIG. 19 shows the configuration of the determining function control unit shown in FIG. 17.

FIG. 19 shows the configuration of the determining function control unit 87 shown in FIG. 17. In the drawing, when the determining function control unit 87 is reported to receive a control frame from the frame distinguishing unit 88, the determining function control unit 87 instructs the radio unit 84 to transmit a carrier wave. If at this time the saving of the power is required, the determining function control unit 87 instructs the power feeding power control unit 89 to reduce the transmitting power of the carrier wave.

Figure 20:
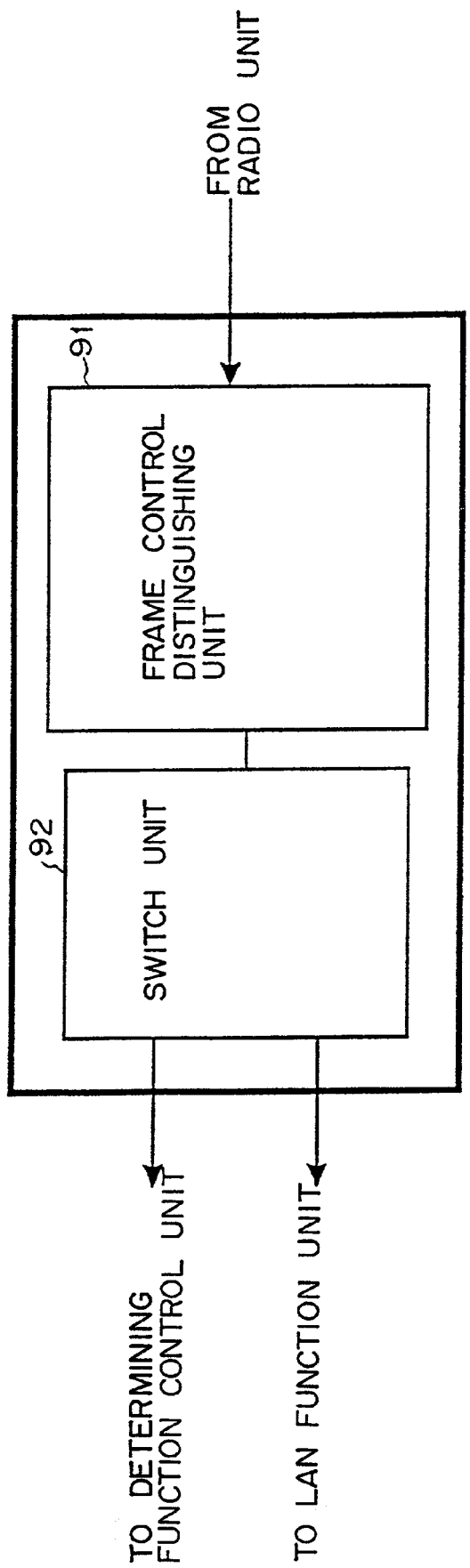
FIG. 20 shows the configuration of a frame distinguishing unit.

FIG. 20 shows the configuration of the frame distinguishing unit 88. In the drawing the control frame distinguishing unit 91 judges whether or not when receiving an input of a receiving frame from the radio unit 84, the frame is a control frame, and outputs the result of the judgement to the switch unit 92. If the frame is a control frame, the switch unit 92 reports to the determining function control unit 87 that the switch unit 92 has received a control frame. On the contrary, if the frame is not a control frame, the switch unit 92 sends the received frame to the LAN function unit 86.

Figure 21:
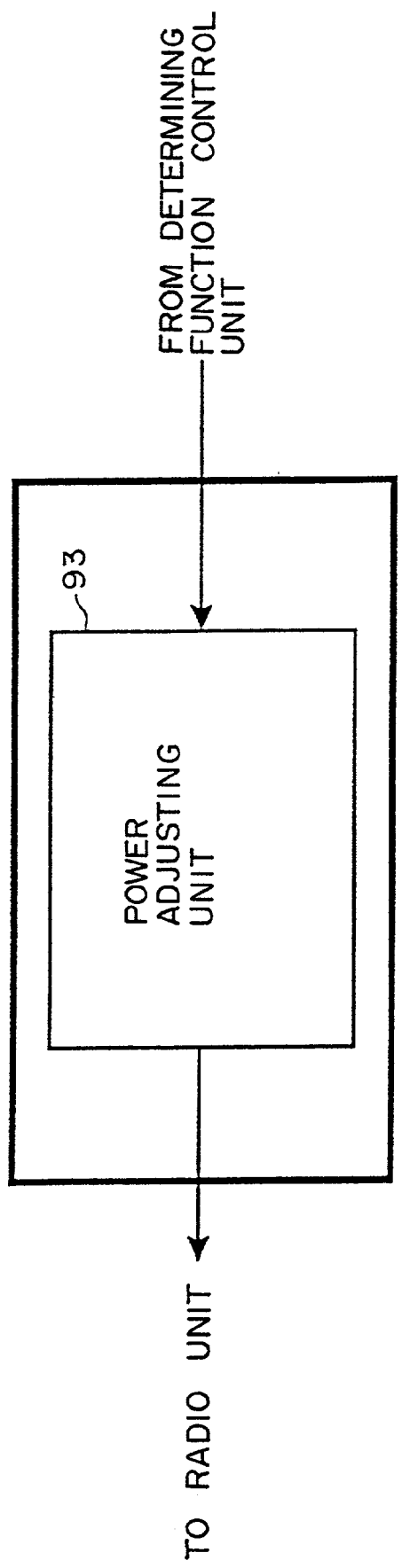
FIG. 21 shows the configuration of the power feeding power control unit shown in FIG. 17.

FIG. 21 shows the configuration of a power feeding power control unit 89. In the drawing, a power regulating unit 93, when a carrier wave is being sent, reduces feeding power according to an instruction from the determining function control unit 87, and feeds the reduced power to the radio unit 84.

Although so far the configuration of a LAN satellite station and the master station are mainly described, the optimization of communication quality of this embodiment is further described in detail below.

In FIG. 5, as described above, in a LAN satellite station 31, first, for example, when a satellite station starts to operate, an instruction to transmit a control frame is issued from the determining function control unit 41 to the control frame generating unit 45, and a control frame different from a normal LAN data frame is transmitted to the master station via the transmitting control unit 47 and the radio unit 34. In this case, since the radiating directivity characteristic of the transmitting antenna 33 of the satellite station is not always directed to the master station, in order to make the master station receive the control frame without fail, it is necessary to transmit this control frame utilizing a broad radiating directivity characteristic.

Such being the case, as explained in FIG. 10, the master station can be made to receive the control frame without fail by transmitting the control frame using only one patch element under the control of the antenna directivity characteristic control unit 42. However, it is not necessarily required to use a patch element at the center 58 as shown in FIG. 10. Since with transmission using only one element, the radiating electric field intensity is weak, in order to make the master station receive the control frame without fail, the control frame is transmitted after the feeding power to the patch element 58 is made greater than the feeding power at the time of normal data frame communication, by the power feeding power control unit 46.

In FIG. 17 the master station 81 receives the control frame transmitted from the satellite station using the receiving antenna 82, the master station 81 verifies by the frame distinguishing unit 88 via the radio unit 84 that the received frame is a control frame, and then the radio unit 84 starts to transmit only a carrier wave under the control of the determining function control unit 87. In this case, the master station does not transfer the control frame to the backbone LAN.

Even if a data frame is transmitted from another satellite station while the master station is transmitting a carrier wave, the satellite station determining an antenna directivity characteristic is not affected by it, since different transmitting frequencies are used for upward transmission, that is, from a satellite station to the master station and downward communication, that is, from the master station to a satellite station, and both electric field intensities are constant. That is, in this case, the satellite station determining an antenna directivity characteristic receives only carrier waves transmitted from the master station, and thereby no collision of a frame occurs. However, as described later, when the satellite station transmits a control frame, when the control frame is transmitted via a backbone LAN, or when another satellite station transmits a control frame or a normal data frame simultaneously, a collision occurs.

Figure 22:
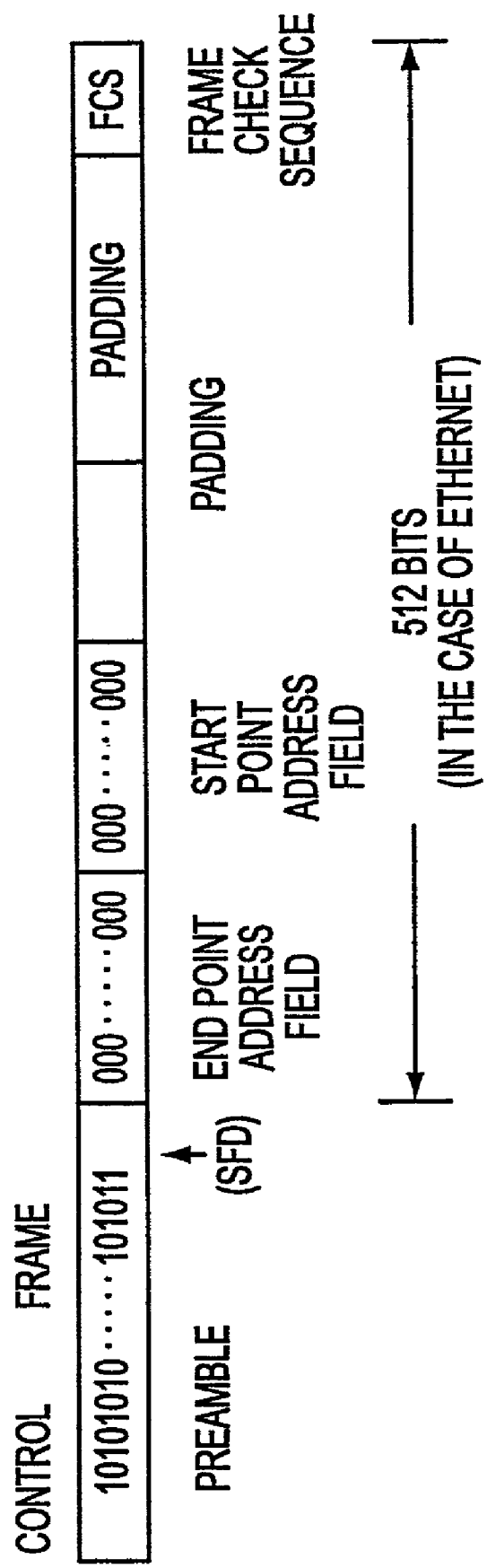
FIG. 22 shows an example of a format for a control frame.

Therefore, it is necessary to clearly distinguish a control frame transmitted from a satellite station from a normal data frame. FIG. 22 shows an example of a format for this control frame. As shown in the drawing, for example, in the master station a control frame can be clearly distinguished from a normal data frame by making all bits for indicating the end point address and start point address of a frame "0". Particularly, as shown in the drawing, in the master station a control frame can be instantaneously distinguished by using a MAC (media access control) address part in the leading part of a frame. The start point address field is a part for setting a unique address in each data terminal. You can also make all start point addresses "1". Or a control frame can be distinguished from a normal data frame by using a part other than a MAC address part. That is, a format for a control frame can be anything, only if it can be distinguished from a normal data frame.

Furthermore, as shown in FIG. 22, for example, in the case of the Ethernet being a typical LAN, when a control frame collides with a normal data frame, by embedding a padding, that is, a bit string of 8 bits with arbitrary contents in the data field of a control frame as a PAD, further embedding a frame check sequence data in the control frame, and making the length of the control frame the shortest possible in the Ethernet, that is, 512 bits, it can be recognized that a collision has occurred in both a satellite station determining an antenna directivity characteristic and terminal which has transmitted data.

Thus, even if there is a satellite station determining a directivity characteristic, normal data communication can be prevented from being affected. On the other hand, the satellite station determining a directivity characteristic stops determining, nullifies the determination, transmits a control frame again from the determining function control unit 41, for example, after a random back-off time, and determines again.

Following the transmission of the control frame, the satellite station detects the receiving electric field intensity of a carrier wave transmitted from the master station by the electric field intensity detecting/storing unit 44, and starts to determine the direction of the master station while changing the directivity characteristic of the receiving antenna by changing the phase of power feeding power by a phase shifter as explained in FIGS. 3 and 4. In this case, the carrier wave, etc. received from the master station are not output from the receiving control unit 43 to the LAN function unit 36. That is, since the level (amplitude) of the carrier wave is smaller the level (amplitude) of data, and since the receiving control unit 43 detects data using a threshold larger than the level of the carrier wave, the carrier is never output to the LAN function unit 36.

In the determination of an antenna directivity characteristic, as explained in FIG. 9, first, an angle θ which can receive a carrier wave in the strongest intensity from the master station in the overall direction of a plane parallel to an antenna plane, is detected, and an angle φ is further detected by determining for 90 degrees of direction in a plane vertical to the antenna plane.

When an antenna directivity characteristic is determined, a determining procedure is executed again depending on the maximum value and the minimum value of detected electric field intensity, if necessary. First, the lowest limit of the electric field intensity of a carrier wave transmitted from the master station is predetermined in the electric field strength detecting/storing unit 44. Then, if an electric field intensity greater than the lowest limit is not detected when determining, a determining procedure is executed again and an optimal direction of radiating beams is decided for the satellite station.

The lowest limit of receiving electric field intensity means a receiving electric field intensity too weak to carry out normal communication. More specifically, for example, the value can be decided and set in the system by actually measuring such a limit in the stage of trial manufacture for the commercialization of a wireless LAN system. Or since the value depends on the characteristics of a system, that is, the characteristics of components used and the transmitting power, the value can be calculated and set in the system. Or the value can also be decided using the incidence of error frames.

The minimum value of the difference between the maximum value and the minimum value of the receiving electric field intensity of a carrier wave transmitted from the master station is stored in the electric field intensity detecting/storing unit 44 of the satellite station in advance, and when a carrier wave cannot be received in a state of having a difference greater than the minimum value, a determining procedure is executed again from the beginning, and an optimal direction of directivity characteristic is decided for a satellite station antenna.

Figures 23A, 23B:
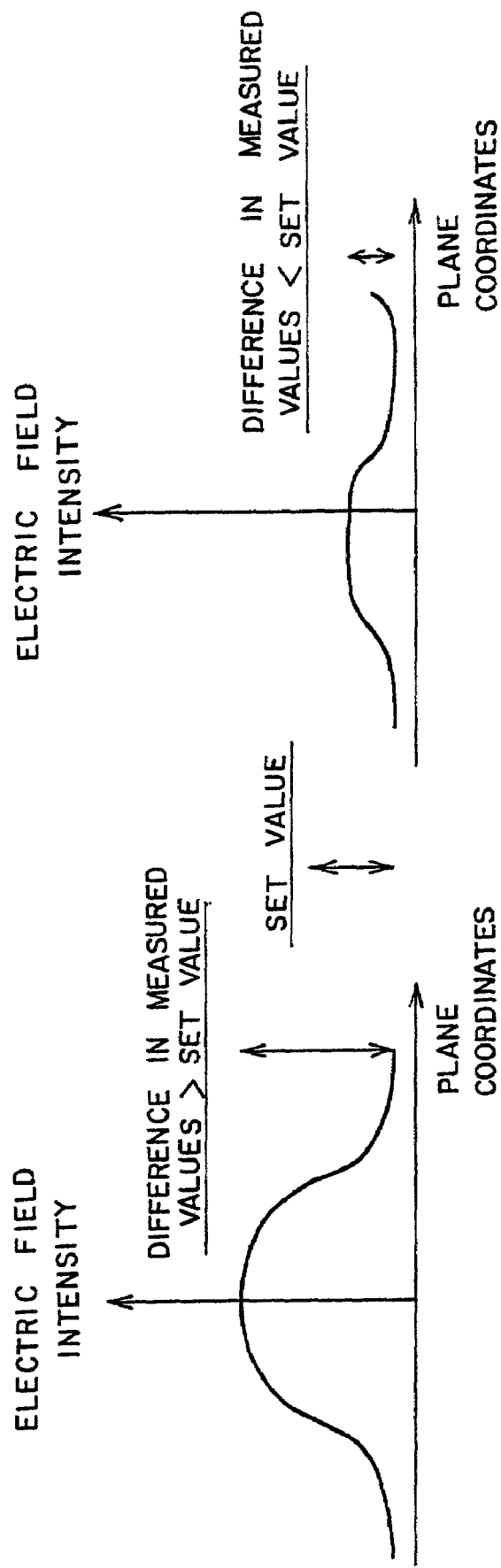
FIG. 23A shows a case where the difference between the maximum value and the minimum value of electric field intensity is regarded as a success as a result of determination.
FIG. 23B shows a case where the difference between the maximum value and the minimum value of electric field intensity is regarded as a failure as a result of determination.

FIGS. 23A and 23B show a case where the success or failure of a determination is judged by whether the minimum value of the difference between the maximum value and the minimum value of receiving electric field intensity is greater or less than a predetermined value. FIG. 23A shows a case where when a coordinate is changed on a plane parallel to an antenna plane as shown in FIG. 9, the measured difference between the maximum value and the minimum value of the receiving electric field intensity is greater than the predetermined value. In such a case the determination shall be regarded as a success. On the contrary, FIG. 23B shows a case where the difference between the maximum value and the minimum value of the receiving electric field intensity is less than the predetermined value and the determination is regarded as a failure.

Furthermore, when in the determination of the directivity characteristic of a satellite station antenna, the maximum value and the minimum value of the receiving electric field intensity of a carrier wave from the master station are detected, a ratio of the maximum value to the minimum value, that is, a ratio of "the maximum value/the minimum value" is stored in the electric field intensity detecting/storing unit 44. Then, if a ratio of the maximum measured value to the minimum measured value is less than the ratio, a determination procedure can be executed again from the beginning and an optimal direction of radiating beams can be decided for a satellite station antenna. Or, on the contrary, a ratio of "the minimum value/the maximum value" is stored in the electric field intensity detecting/storing unit 44 in advance. Then, if a ratio of the minimum measured value to the maximum measured value is the same as or greater than the ratio, a determining procedure can be executed again from the beginning.

Next, the determination executed again after a determination is terminated and the optimal direction of directivity characteristic is fixed, and the normal transmission and reception of data, that is, the transmission and reception of data frames between a satellite station and the master station is started, is described below.

The satellite station stores in advance such a threshold receiving electric field intensity of a data frame that normal communication between the satellite station and the master station may be started to be affected, in the electric field intensity detecting/storing unit 44, and detects the receiving electric field intensity of a normal data frame received from the master station. When the receiving electric field intensity of a data frame transmitted from the master station becomes less than a predetermined limit due to the movement of a data terminal or a satellite station connected to the data terminal or the shift of the position of an antenna, an instruction to start to determine is sent from the determining function, control unit 41 to the control frame generating unit 45 as described above, a determination is re-started, and thereby an optimal communication environment can be secured again.

In this case, if an electric field intensity greater than the lowest limit of receiving electric field intensity of a carrier wave from the master station stored in advance as described above while determining is not detected, a determining procedure can be executed once more. The same applies to the minimum value of the difference between the maximum value and the minimum value, a ratio of the maximum value to the minimum value and a ratio of the minimum value to the maximum value.

Furthermore, for the intensity of a receiving carrier wave from the master station not only electric field intensity but also magnetic field intensity can be adopted as a standard. Furthermore, in an infrared ray wireless LAN system, infrared ray intensity can also be adopted as a standard.

For another condition for determining again after the transmission and reception of a normal data frame is started between a satellite station and the master station, there is an error of a data frame. As shown in FIG. 5, each of the satellite stations is provided with an FCS error frame detecting unit/counter 48. If an error is detected in a frame received from the master station, the number of the frames with an error is counted, the determining function control unit 41 instructs to start to determine in the same way as described before, when the number of frames reaches the predetermined number of frames, and determines an antenna directivity characteristic in order to secure an optimal communication environment. In this case, the same processes as described above can be executed for the lowest limit, the minimum value of the difference between the maximum value and the minimum value, a ratio of the maximum value to the minimum value and a ratio of the minimum value to the maximum value of electric field intensity, and if the requirements are not met, a determination can be executed again.

It can be configured so that when the number of error frames consecutively received reaches a predetermined number, a determination is executed again in the same way as described above. Or it can also be configured that a timer 37 is started to operate when the first error frame is received, and if the number of error frames received by the time-out of the timer 37 reaches a predetermined number, a determination of an antenna directivity characteristic is executed again. It can also be configured that if the predetermined number of error frames is not received during the time-out period of the timer 37, the counter is cleared after the time-out period elapses, and when an error frame is received again, the start of the timer 37 and the processes after that are repeated.

Or it can also be configured that when an error frame is received, the timer 37 is started to operate, and when the number of error frames reaches the predetermined number, a determination of an antenna directivity characteristic is started. Even if the timer 37 is started to operate and further several error frames are consecutively received, the counter and the timer are reset when a normal frame is received before the number of error frames reaches the predetermined number. When the timer 37 time-outs, the counter is cleared.

It can also be configured that even when the timer 37 is started to operate in this way, the same processes as described above are executed for the lowest limit, the minimum value in difference between the maximum value and the minimum value, a ratio of the maximum value to the minimum value and a ratio of the minimum value to the maximum value of receiving electric field intensity, and a determination of an antenna directivity characteristic is executed again.

Next, concerning the operation of the master station, it can also be configured that when a control frame is received from a satellite station, and a carrier wave is returned to the satellite station, a carrier wave is transmitted in a state where transmitting power is made less than the transmitting power at the time of transmission of a normal data frame by the power feeding power control unit 89 shown in FIG. 17. Thus, the power consumption can be reduced.

When a data frame is transmitted from another satellite station or a backbone LAN while the master station is transmitting a carrier wave with a transmitting power less than the transmitting power at the time of a normal data communication and the satellite station is determining an antenna directivity characteristic, it is anticipated that the electric field intensity detecting/storing unit 44 of the satellite station detects a discontinuous and rapid rise of electric field intensity. In this case, since an optimal direction of a normal antenna directivity characteristic cannot be determined, an antenna directivity characteristic can be determined by the satellite station stopping the determining, clearing the result of the determination so far, transmitting a control frame again when the transmission of data frames is terminated or after a certain time determined by, for example, a random back-off algorithm elapses, and making the master station transmit a carrier wave.

As described in detail above, according to the present invention, an optimal communication environment can be secured without adjusting the position of a data terminal, a satellite station or a satellite station antenna, by adopting a satellite station antenna the radiating directivity characteristic of which can be freely changed, transmitting a control frame from the satellite station, the master station starting to return a carrier wave, the satellite station determining such a direction of antenna directivity characteristic that a carrier wave transmitted from the master station may be received with the maximum intensity, and fixing the directivity characteristic of a satellite station antenna to the direction of the master station in a wireless LAN system mainly using a millimeter wave.

Furthermore, the wireless LAN system can automatically cope with the deterioration of a communication environment due to the movement of a data terminal or a satellite station, or the shift of the position of an antenna, and the best communication quality can be always provided by setting conditions for the number of error frames allowed to be received in a satellite station, or the receiving electric field intensity of a data frame, and determining an optimal antenna directivity characteristic again when the conditions are not met.

The power in the master station can also be saved by making the intensity of a carrier wave transmitted from the master station while determining, less than the intensity at the time of normal data communication.

Accordingly, according to the present invention a strong and flexible wireless LAN system can be constructed, and the present invention greatly contributes to the realization of a high-speed wireless LAN system using a millimeter wave in an unused wave range assigned to data communication.

What is claimed is:

1. A wireless local area network system comprising:
    a wireless local area network master station for supporting communication between satellite stations belonging to a master station, and one or more wireless local area network satellite stations, wherein the satellite station in the relevant local area network comprises
    an antenna for dynamically changing a directivity characteristic when receiving electric waves from the master station;
    a control frame transmitting unit transmitting control frames prior to the commencement of communication; and
    an antenna directivity characteristic controlling unit determining such a directivity characteristic that the receiving electric field intensity of a carrier wave transmitted from the master station when receiving the relevant control frame may become a maximum by changing the directivity characteristic of said antenna, and
    the master station in the relevant local area network system comprises a carrier wave transmitting unit starting to transmit carrier waves when receiving said control frame, and
    wherein directions of radiating directivity characteristic can be freely changed on a hemispherical plane of an antenna plane by changing each power feeding phase using phase shifters.

2. A wireless local area network system comprising:
    a wireless local area network master station for supporting communication between satellite stations belonging to a master station, and a plurality of wireless local area network satellite stations, wherein the satellite station comprises:
    an antenna directivity characteristic adjusting unit adjusting the antenna directivity characteristic of a receiving antenna so that the receiving electric field intensity of electro-magnetic waves transmitted from the master station becomes a maximum, and
    the master station comprises electro-magnetic wave transmitting unit transmitting electromagnetic waves with such intensity as to enable a satellite station to detect at least said receiving electric field intensity while the directivity characteristic of the relevant receiving antenna is adjusted in the satellite station, and
    wherein directions of radiating directivity characteristic can be freely changed on a hemispherical plane of an antenna plane by changing each power feeding phase using phase shifters.

3. A transmitter-receiver for communicating with another party in a wireless local area network system provided with an antenna, the directivity characteristic of which can be dynamically changed when receiving electric waves, comprising:
    a control frame distinguishing unit distinguishing a control frame transmitted from said communication partner from a data frame prior to the commencement of communication; and
    a carrier wave transmitting unit starting to transmit a carrier wave so that said communication partner may determine such a directivity characteristic that the receiving electric field intensity of said antenna may become a maximum, and
    wherein directions of radiating directivity characteristic can be freely changed on a hemispherical plane of an antenna plane by changing each power feeding phase using phase shifters.

4. The transmitter-receiver according to claim 3, wherein the antenna provided for said communication partner is an active phased planar-array antenna.

5. The transmitter-receiver according to claim 3, wherein said carrier wave transmitting unit makes the transmitting power of the carrier waves less than the transmitting power at the time of a normal data frame when receiving said control frame.

6. A method for optimizing communication quality in a wireless local area network system comprising a master station for supporting communication between satellite stations belonging to the master station, comprising:
    enabling the relevant satellite station to perform:
        transmitting a control frame to a communication partner prior to the commencement of communication;
        determining such a directivity characteristic that the receiving electric field intensity of a carrier wave transmitted from the master station in the relevant local area network may become a maximum when receiving said control frame by changing the directivity characteristic of an antenna, the directivity characteristic of which can be dynamically changed when receiving said control frame; and enabling the master station in the relevant local area network system to perform the step of starting to transmit a carrier wave when receiving said control frame, and wherein directions of radiating directivity characteristic can be freely changed on a hemispherical plane of an antenna plane by changing each power feeding phase using phase shifters.

7. A wireless local area network system comprising:

a wireless local area network master station for supporting communication between satellite stations belonging to the master station, and one or more wireless local area network satellite stations, wherein the satellite station in the relevant local area network comprises an antenna for dynamically changing a directivity characteristic when receiving electric waves from the master station;

control frame transmitting means for transmitting control frames prior to the commencement of communications; and antenna directivity characteristic controlling means for determining such a directivity characteristic that the receiving electric field intensity of a carrier wave transmitted from the master station when receiving the relevant control frame may become a maximum by changing the directivity characteristic of said antenna, and the master station in the relevant local area network system comprises carrier wave transmitting means for starting to transmit carrier waves when receiving said control frame, and wherein directions of radiating directivity characteristic can be freely changed on a hemispherical plane of an antenna plane by changing each power feeding phase using phase shifters.

* * * * *